US011212151B2

(12) United States Patent
Park et al.

(10) Patent No.: US 11,212,151 B2
(45) Date of Patent: Dec. 28, 2021

(54) USER MULTIPLEXING FOR UPLINK CONTROL INFORMATION

(71) Applicant: QUALCOMM Incorporated, San Diego, CA (US)

(72) Inventors: Seyong Park, San Diego, CA (US); Yi Huang, San Diego, CA (US); Renqiu Wang, San Diego, CA (US); Sony Akkarakaran, Poway, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/107,783

(22) Filed: Aug. 21, 2018

(65) Prior Publication Data

US 2019/0068424 A1 Feb. 28, 2019

Related U.S. Application Data

(60) Provisional application No. 62/549,414, filed on Aug. 23, 2017.

(51) Int. Cl.
*H04W 4/00* (2018.01)
*H04L 27/26* (2006.01)
*H04L 5/00* (2006.01)

(52) U.S. Cl.
CPC ........ *H04L 27/2627* (2013.01); *H04L 5/0007* (2013.01); *H04L 5/0019* (2013.01);
(Continued)

(58) Field of Classification Search
None
See application file for complete search history.

(56) References Cited

U.S. PATENT DOCUMENTS 7,952,991 B2 * 5/2011 Kim .................... H04L 27/2602
370/210
8,867,496 B2 * 10/2014 Han .................... H04L 27/2697
370/335
(Continued)

FOREIGN PATENT DOCUMENTS

WO WO-2014058236 A1 4/2014
WO WO-2017028042 A1 2/2017

OTHER PUBLICATIONS

Ericsson: "On the Design of Long PUCCH for more than 2 bits UCI", 3GPP Draft; R1-1714423, 3rd Generation Partnership Project (3GPP), Mobile Competence Centre, 650, Route Des Lucioles F-06921 Sophia-Antipolis Cedex, France, vol. RAN WG1, No. Prague, Czech Republic, Aug. 21, 2017-Aug 25, 2017 Aug. 20, 2017 (Aug. 20, 2017), XP051317202, 10 Pages, Retrieved from the Internet: URL:http://www.3gpp.org/ftp/Meetings_3GPP_SYNC/ RAN1/Docs/ [retrieved on Aug. 20, 2017].
(Continued)

*Primary Examiner* — Gerald A Smarth
(74) *Attorney, Agent, or Firm* — Holland & Hart LLP/Qualcomm

(57) ABSTRACT

Methods, systems, and devices for wireless communications are described. Pre-discrete Fourier transform (DFT) time-domain spreading codes may be applied for UE multiplexing for uplink control information (e.g., over shared resources of an uplink slot). For example, a moderate number of UEs may be multiplexed within the same slot by having each UE spread modulation symbols before DFT-spreading by different spreading code. For orthogonality across UEs, the pre-DFT spreading codes may be selected as orthogonal cover codes (OCCs). The spreading sequences can be generated from a set of any orthogonal sequences or generated from unitary matrices. In some cases, orthogonality in the time domain may be kept as well as a frequency division
(Continued)

multiplexed (FDM) structure in the frequency domain. For such property, a Fourier basis OCC design may be used. In some other examples, a Hadamard matrix based OCC design may be used.

49 Claims, 16 Drawing Sheets

(52) U.S. Cl.
CPC ........ *H04L 5/0053* (2013.01); *H04L 27/2602* (2013.01); *H04L 27/2634* (2013.01); *H04L 27/2636* (2013.01)

(56) References Cited

U.S. PATENT DOCUMENTS

| | | | | |
|---|---|---|---|---|
| 9,155,087 B2* | 10/2015 | Han | ............... | H04L 5/001 |
| 9,723,594 B2* | 8/2017 | Han | ............... | H04L 5/0053 |
| 10,637,705 B1* | 4/2020 | Shattil | ............... | H04L 1/1861 |
| 2005/0281317 A1* | 12/2005 | Oh | ............... | H04B 1/713 |
| | | | | 375/132 |
| 2009/0059882 A1* | 3/2009 | Hwang | ............ | H04L 25/03159 |
| | | | | 370/342 |
| 2009/0129259 A1* | 5/2009 | Malladi | ............ | H04B 7/0417 |
| | | | | 370/210 |
| 2010/0135360 A1* | 6/2010 | Kwak | ............ | H04L 5/0016 |
| | | | | 375/135 |
| 2010/0296465 A1* | 11/2010 | Hooli | ............ | H04J 11/00 |
| | | | | 370/329 |
| 2011/0013532 A1* | 1/2011 | Wu | ............ | H04L 25/0226 |
| | | | | 370/252 |
| 2012/0307928 A1* | 12/2012 | Jia | ............ | H04B 7/0667 |
| | | | | 375/267 |
| 2012/0320859 A1 | 12/2012 | Ahn et al. | | |
| 2013/0114755 A1* | 5/2013 | Cheng | ............ | H04B 7/0456 |
| | | | | 375/295 |
| 2013/0128834 A1* | 5/2013 | Higuchi | ............ | H03M 13/2957 |
| | | | | 370/329 |
| 2013/0286996 A1* | 10/2013 | Takeda | ............ | H04L 1/1692 |
| | | | | 370/329 |
| 2014/0254530 A1* | 9/2014 | Kim | ............ | H04L 5/0019 |
| | | | | 370/329 |
| 2015/0249980 A1* | 9/2015 | You | ............ | H04L 1/1861 |
| | | | | 370/329 |
| 2017/0195096 A1 | 7/2017 | Yamamoto et al. | | |
| 2018/0062894 A1* | 3/2018 | Ma | ............ | H04L 5/0007 |
| 2021/0144039 A1 | 5/2021 | Park | | |

OTHER PUBLICATIONS

Interdigital et al., "Considerations for Ultra-Reliable UCI transmission", 3GPP Draft;,R1-1714114 (R15 NR WI AI 61326 URLLC UCI Transmission), 3rd Generation Partnership Project (3GPP), Mobile Competence Centre, 650, Route Des Lucioles, F-06921 Sophia-Antipolis Cedex, France vol. RAN WG1, No. Prague, Czech Republic, Aug. 21, 2017-Aug. 25, 2017, Aug. 20, 2017 (Aug. 20, 2017), XP051316903, 4 Pages, Retrieved from the Internet: URL:http://www.3gpp.org/ftp/Meetings_3GPP_SYNC/RAN1/Docs/ [retrieved on Aug. 20, 2017].

International Search Report and Written Opinion—PCT/US2018/047593—ISA/EPO—dated Oct. 9, 2018 (176113WO).

Qualcomm Incorporated: "Long PUCCH design with more than 2 bits UCI Payload", 3GPP Draft, R1-1714604 Long PUCCH Design with more than 2 bits UCI Payload, 3rd Generation Partnership Project (3GPP), Mobile Competence Centre, 650, Route Des Lucioles, F-06921 Sophia-Antipolis Cedex, France vol. RAN WG1, No. Prague, Czech Republic, Aug. 21, 2017-Aug. 25, 2017 Aug. 20, 2017 (Aug. 20, 2017), XP051328136, 10 Pages, Retrieved from the Internet: URL:http://www.3gpp.org/ftp/tsg_ran/WG1_RL1/TSGR1_90/Docs/ [retrieved on Aug. 20, 2017].

Taiwan Search Report—TW107129286—TIPO—dated Aug. 30, 2021.

* cited by examiner

USER MULTIPLEXING FOR UPLINK CONTROL INFORMATION

CROSS REFERENCES

The present application for patent claims the benefit of U.S. Provisional Patent Application No. 62/549,414 by PARK et al., entitled "USER MULTIPLEXING FOR UPLINK CONTROL INFORMATION," filed Aug. 23, 2017, assigned to the assignee hereof, and expressly incorporated by reference herein in its entirety.

BACKGROUND

The following relates generally to wireless communication, and more specifically to user multiplexing for uplink control information (UCI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may utilize multiplexing schemes such that one or more UEs may utilize the same time-frequency resources for communications. Some multiplexing schemes may require multiplying modulated communications (e.g., modulation symbols) by a cover code across multiple symbols. Present techniques for applying cover codes across multiple symbols may result in inefficient resource utilization.

SUMMARY

A method of wireless communication is described. Some wireless communications systems may utilize multiplexing schemes such that one or more UEs may utilize the same time-frequency resources for communications. In some cases, one or more UEs may utilize a minimum unit of frequency resources (e.g., a resource block or a set of resource elements). Some multiplexing schemes may require multiplying modulated communications (e.g., modulation symbols) by a cover code across multiple symbols of the minimum unit of frequency resources. In some cases, the minimum unit may be unable to be easily divided among multiple UEs, and, as a result, the modulated communications of the multiple UEs may need to be repeated across multiple symbols, which may result in inefficient resource utilization. The described method may include scheduling, at a base station, a plurality of user equipments (UEs) for transmitting respective uplink control information within a first set of frequency resources of an uplink slot and configuring each of the plurality of UEs to spread modulation symbols of the respective uplink control information using a plurality of respective spreading codes prior to performing a discrete Fourier transform (DFT) spreading process, wherein the plurality of respective spreading codes comprise orthogonal cover codes. By utilizing orthogonal cover codes, multiple UEs may utilize the minimum unit of frequency resources in a manner that limits interference within the frequency resources and limits the necessity to retransmit communications across multiple symbols.

An apparatus for wireless communication is described. The apparatus may include means for scheduling, at a base station, a plurality of UEs for transmitting respective uplink control information within a first set of frequency resources of an uplink slot and means for configuring each of the plurality of UEs to spread modulation symbols of the respective uplink control information using a plurality of respective spreading codes prior to performing a DFT spreading process, wherein the plurality of respective spreading codes comprise orthogonal cover codes.

Another apparatus for wireless communication is described. The apparatus may include a processor, memory in electronic communication with the processor, and instructions stored in the memory. The instructions may be operable to cause the processor to schedule, at a base station, a plurality of UEs for transmitting respective uplink control information within a first set of frequency resources of an uplink slot and configure each of the plurality of UEs to spread modulation symbols of the respective uplink control information using a plurality of respective spreading codes prior to performing a DFT spreading process, wherein the plurality of respective spreading codes comprise orthogonal cover codes.

A non-transitory computer readable medium for wireless communication is described. The non-transitory computer-readable medium may include instructions operable to cause a processor to schedule, at a base station, a plurality of UEs for transmitting respective uplink control information within a first set of frequency resources of an uplink slot and configure each of the plurality of UEs to spread modulation symbols of the respective uplink control information using a plurality of respective spreading codes prior to performing a DFT spreading process, wherein the plurality of respective spreading codes comprise orthogonal cover codes.

Some examples of the method, apparatus, and non-transitory computer-readable medium described above may further include processes, features, means, or instructions for receiving, over the first set of frequency resources of the uplink slot, a plurality of multiplexed uplink transmissions from the plurality of UEs comprising the respective uplink control information. Some examples of the method, apparatus, and non-transitory computer-readable medium described above may further include processes, features, means, or instructions for demapping the plurality of multiplexed uplink transmissions. Some examples of the method, apparatus, and non-transitory computer-readable medium described above may further include processes, features, means, or instructions for despreading the plurality of multiplexed uplink transmissions according to the plurality of respective spreading codes to obtain the respective uplink control information.

In some examples of the method, apparatus, and non-transitory computer-readable medium described above, the respective spreading codes may be Fourier basis orthogonal cover codes. In some examples of the method, apparatus, and non-transitory computer-readable medium described above, the respective spreading codes may be selected such that uplink transmissions from different ones of the plurality of UEs are orthogonal in the frequency domain after the DFT spreading process. In some examples of the method, apparatus, and non-transitory computer-readable medium described above, the frequency domain orthogonality may include frequency division multiplexing of the uplink transmissions from the different ones of the plurality of UEs.

In some examples of the method, apparatus, and non-transitory computer-readable medium described above, the respective spreading codes may be Hadamard matrix based orthogonal cover codes.

A method of wireless communication is described. The method may include identifying a spreading code of a plurality of spreading codes for spreading a set of modulation symbols of uplink control information, spreading the set of modulation symbols using the spreading code prior to a DFT spreading process, the DFT spreading process generating a set of frequency domain symbols, and transmitting a time-domain waveform obtained from the set of frequency domain symbols to a serving base station in a symbol period of an uplink slot.

An apparatus for wireless communication is described. The apparatus may include means for identifying a spreading code of a plurality of spreading codes for spreading a set of modulation symbols of uplink control information, means for spreading the set of modulation symbols using the spreading code prior to a DFT spreading process, the DFT spreading process generating a set of frequency domain symbols, and means for transmitting the time-domain waveform obtained from the set of frequency domain symbols to a serving base station in a symbol period of an uplink slot.

Another apparatus for wireless communication is described. The apparatus may include a processor, memory in electronic communication with the processor, and instructions stored in the memory. The instructions may be operable to cause the processor to identify a spreading code of a plurality of spreading codes for spreading a set of modulation symbols of uplink control information, spread the set of modulation symbols using the spreading code prior to a DFT spreading process, the DFT spreading process generating a set of frequency domain symbols, and transmit a time-domain waveform obtained from the set of frequency domain symbols to a serving base station in a symbol period of an uplink slot.

A non-transitory computer readable medium for wireless communication is described. The non-transitory computer-readable medium may include instructions operable to cause a processor to identify a spreading code of a plurality of spreading codes for spreading a set of modulation symbols of uplink control information, spread the set of modulation symbols using the spreading code prior to a DFT spreading process, the DFT spreading process generating a set of frequency domain symbols, and transmit a time-domain waveform obtained from the set of frequency domain symbols to a serving base station in a symbol period of an uplink slot.

In some examples of the method, apparatus, and non-transitory computer-readable medium described above, the plurality of spreading codes comprise orthogonal cover codes.

Some examples of the method, apparatuses, and non-transitory computer-readable medium described herein may further include operations, features, means, or instructions for mapping the set of frequency domain symbols to a set of subcarriers associated with a set of frequency resources assigned to the UE for the uplink control information. Some examples of the method, apparatuses, and non-transitory computer-readable medium described herein may further include operations, features, means, or instructions for performing an inverse discrete Fourier transform on the mapped set of frequency domain symbols to obtain the time-domain waveform for the uplink control information.

Some examples of the method, apparatuses, and non-transitory computer-readable medium described herein may further include operations, features, means, or instructions for identifying a second set of modulation symbols of the uplink control information for the symbol of the uplink slot and spreading the second set of modulation symbols using a scalar of the spreading code prior to the DFT spreading process. In some examples of the method, apparatuses, and non-transitory computer-readable medium described herein, the second set of modulation symbols may be the same as the set of modulation symbols.

In some examples of the method, apparatuses, and non-transitory computer-readable medium described herein, the spreading code may be applied to each modulation symbol of the set of modulation symbols. In some examples of the method, apparatuses, and non-transitory computer-readable medium described herein, the spreading code may be a Fourier basis orthogonal cover code. In some examples of the method, apparatuses, and non-transitory computer-readable medium described herein, the spreading code may be a Hadamard matrix based orthogonal cover code

DETAILED DESCRIPTION

Aspects of the description are directed to applying pre-discrete Fourier transform (DFT) time-domain spreading codes for UE multiplexing for uplink control. Some wireless communications systems may utilize multiplexing schemes that require multiplying modulated communications (e.g., modulation symbols) by a cover code across multiple symbols. As a result, the modulated communications may need to be repeated across multiple symbols, which may result in inefficient resource utilization. For example, an uplink control channel (e.g., physical uplink control channel (PUCCH)) may have shared resources for uplink transmissions from multiple UEs. Multiple UEs (e.g., 2, 3, 4, 5, 6 or more UEs) may, for example, be multiplexed for transmission using one resource block (RB), which may span a number of tones (e.g., 12) over a slot (e.g., which may include a number of symbol periods). In accordance with aspects of the present disclosure, user equipments (UEs) may apply pre-DFT time-domain spreading codes for UE multiplexing for uplink control information (e.g., over shared resources of an uplink slot). For example, a moderate number of UEs may be multiplexed within the same slot by having each UE spread modulation symbols before DFT-spreading (DFT-s) by different spreading codes. For orthogonality across UEs, the pre-DFT spreading codes may be selected as orthogonal cover codes (OCCs).

The spreading sequences can be generated from a set of any orthogonal sequences or generated from unitary matrices. In some cases, it may be desirable to keep not only the orthogonality in the time domain but also a frequency division multiplexed (FDM) structure in the frequency domain. For such property, a Fourier basis OCC design may be preferred. Additionally, or alternatively, a Hadamard matrix based OCC design may be used.

Aspects of the disclosure are initially described in the context of a wireless communications system. Aspects of the disclosure are then described with reference to examples of symbol generation. Aspects of the disclosure are further illustrated by and described with reference to apparatus diagrams, system diagrams, and flowcharts that relate to user multiplexing for uplink control information.

Figure 1:
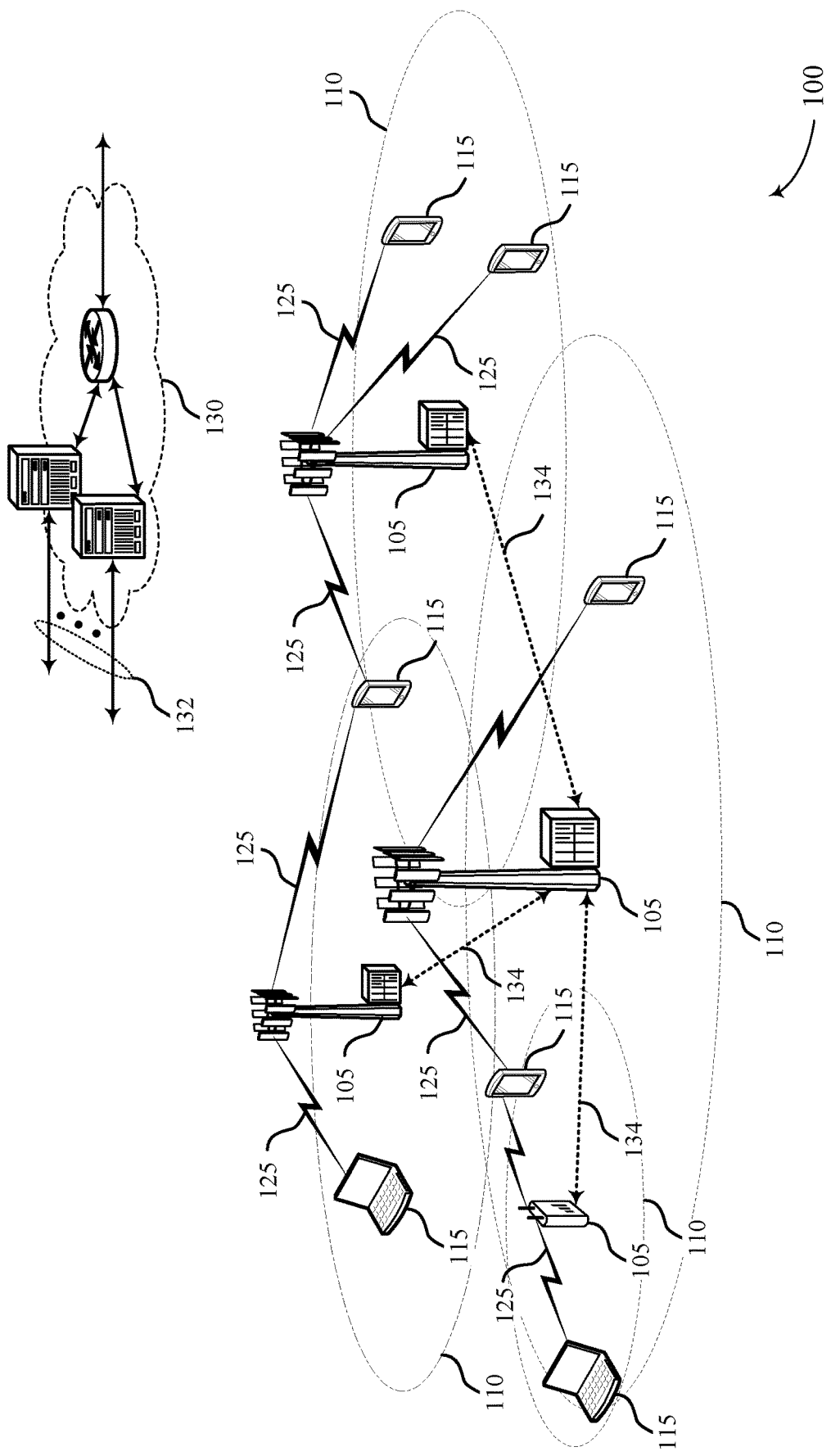
FIG. 1 illustrates an example of a wireless communications system that supports user multiplexing for uplink control information in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Some wireless communications systems 100 may utilize multiplexing schemes that require multiplying modulated communications (e.g., modulation symbols) by a cover code across multiple symbols. As a result, the modulated communications may need to be repeated across multiple symbols, which may result in inefficient resource utilization. In accordance with aspects of the present disclosure, UEs 115 may apply pre-DFT time-domain spreading codes for UE multiplexing for uplink control information (e.g., over shared resources of an uplink slot). For example, a moderate number of UEs 115 may be multiplexed within the same slot by having each UE 115 spread the modulation symbols before DFT-s by different spreading codes. For orthogonality across UEs 115, the pre-DFT spreading codes may be selected as OCCs.

Figure 2:
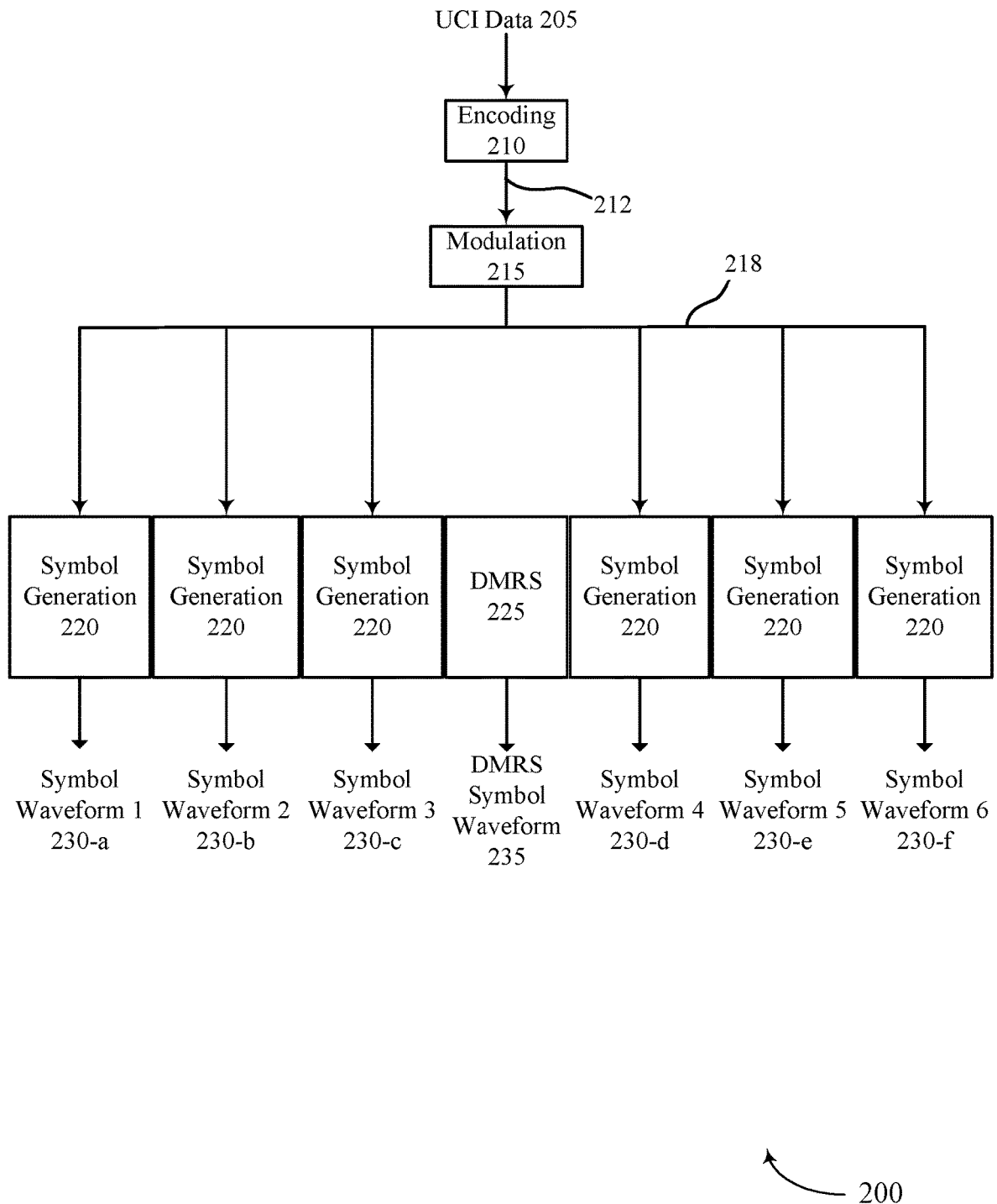
FIGS. 2 through 6 illustrate examples of symbol generation that support user multiplexing for uplink control information in accordance with aspects of the present disclosure.

FIG. 2 illustrates an example of symbol generation 200 for user multiplexing for uplink control information (UCI) in accordance with various aspects of the present disclosure. In some examples, symbol generation 200 may be implemented by aspects of wireless communication system 100 such as a UE 115 as described with reference to FIG. 1.

Symbol generation 200 may illustrate OFDM or DFT-s-OFDM symbol generation for an uplink slot. In some cases, the symbol generation may be for a long PUCCH. The long PUCCH may span, for example, an uplink centric slot, or multiple mini-slots. Thus, the symbol generation 200 may generate multiple OFDM symbols, and may include DMRS. Symbol generation 200 illustrates an example uplink slot or long PUCCH having three data symbols, one DMRS symbol, and three data symbols (e.g., spanning seven symbol periods of an uplink slot). In some cases, the same structure can be repeated with frequency hopping (e.g., in alternating slots).

In some examples, UCI 205 may be encoded at block 210 to generate encoded UCI data 212. The encoded UCI data 212 may be modulated at block 215 to generate a set of modulation symbols 218 for the UCI. Symbol generation 220 may, based the set of modulation symbols 218, generate symbol waveforms 230 (e.g., OFDM, DFT-s-OFDM). As shown in FIG. 2, symbol generation 220 may generate a set of symbol waveforms 230 (e.g., symbol waveforms 230-a, 230-b, 230-c, 230-d, 230-e, and 230-f). DMRS symbol generation 225 may generate one or more DMRS symbol waveforms 235. In some examples, the DMRS symbol waveforms 235 may be placed in or near the middle of a set of PUCCH symbols. As illustrated in FIG. 2, DMRS symbol waveform 235 is in the middle symbol of seven UCI symbols.

In some cases, the number of generated modulation symbols 218 may be based on the length of an orthogonal cover code (OCC) and the number of available time-frequency resources that may be utilized for communication. The length of an OCC may be based on the number of UEs 115 that may utilize available time-frequency resources. For example, when two UEs 115 utilize twelve subcarriers (e.g., or tones) per symbol period, a resulting OCC length of two (e.g., when OCC length equals the number of UEs that may utilize the available time-frequency resources) may be applied to six generated modulation symbols 218 (e.g., when the number of generated modulation symbols 218 equals the number of available time-frequency resources divided by the OCC length). In another example, when three UEs may be able to utilize twelve subcarriers per symbol period, a resulting OCC length of three may be applied to four generated modulation symbols 218. In yet another example, when four UEs may be able to utilize twelve subcarriers per symbol period, a resulting OCC length of four may be applied to three generated modulation symbols 218.

Figure 3:
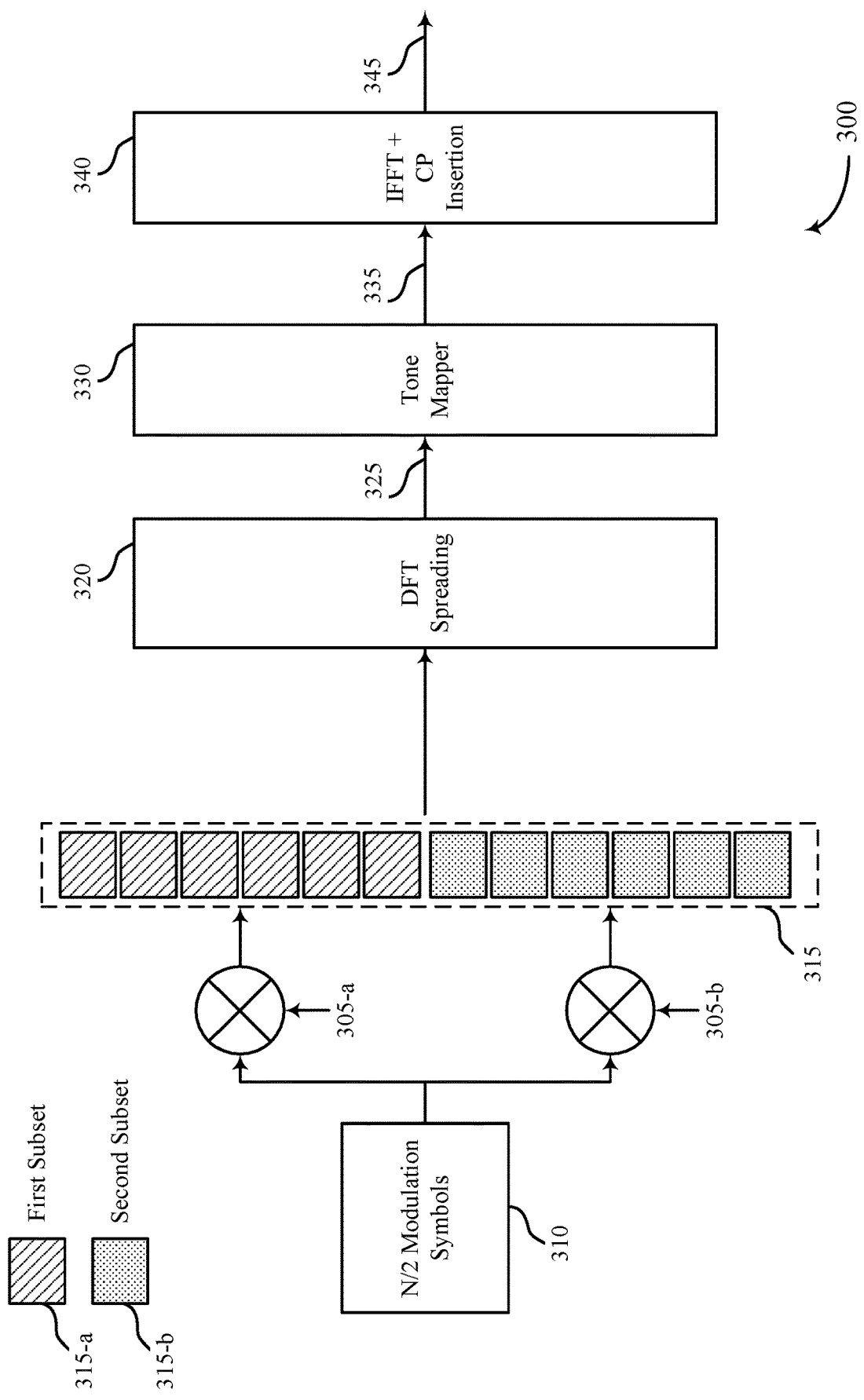

FIG. 3 illustrates symbol generation 300 for an OFDM symbol for user multiplexing for UCI in accordance with various aspects of the present disclosure. In some examples, symbol generation 300 illustrates symbol generation for one OFDM symbol of FIG. 2 for a UE k using an OCC 305 of length 2 over one resource block having N tones (e.g., 12 tones). As described above with reference to FIG. 2, the OCC length of 2 may be based on the number of UEs that may utilize the resource block for communications.

In the example symbol generation 300, N/2 modulation symbols 310 of control information (e.g., UCI) are repeated to make two sets of N/2 modulation symbols and multiplied by first and second scalars 305-a, 305-b of a length two OCC 305, respectively to obtain a set of spread modulation symbols 315 including two subsets of spread modulation symbols 315. The first and second scalars 305-a, 305-b may correspond to an OCC sequence [A(k,1), A(k,2)], where the first UE is associated with the sequence index k, and sequences having different indices k are orthogonal from each other. For example, the OCC sequence [A(1,1), A(1,2)] for a first UE 115 (e.g., k=1) will be different (e.g., orthogonal) from the OCC sequence [A(2,1), A(2,2)] for a second UE 115 (e.g., k=2).

Each modulation symbol 310 for a first UE 115 (e.g., k=1) may be multiplied by OCC 305-a (e.g., A(k,1)) and by OCC 305-b (e.g., A(k,2)) to obtain the set of spread modulation symbols 315 including subsets of modulation symbols 315-a, 315-b multiplied by different scalars of the OCC 305. A second UE 115 (e.g., k=2) may perform the same OCC processing to its set of modulation symbols 310 using its respective OCC sequence (e.g., OCC sequence [A(2,1), A(2,2)]).

At 320, UEs 115 may perform DFT spreading on the set of spread modulation symbols 315 to obtain frequency domain symbols 325. The UE 115 may map the generated frequency domain symbols 325 to tones (e.g., or subchannels or subcarriers) of a resource block at 330. The UE 115 may then perform an inverse fast Fourier transform (IFFT) and cyclic prefix (CP) insertion on the mapped symbols 335 generated at 330 during 340 to produce a DFT-s-OFDM symbol waveform 345 for transmission in one symbol period.

Figure 4:
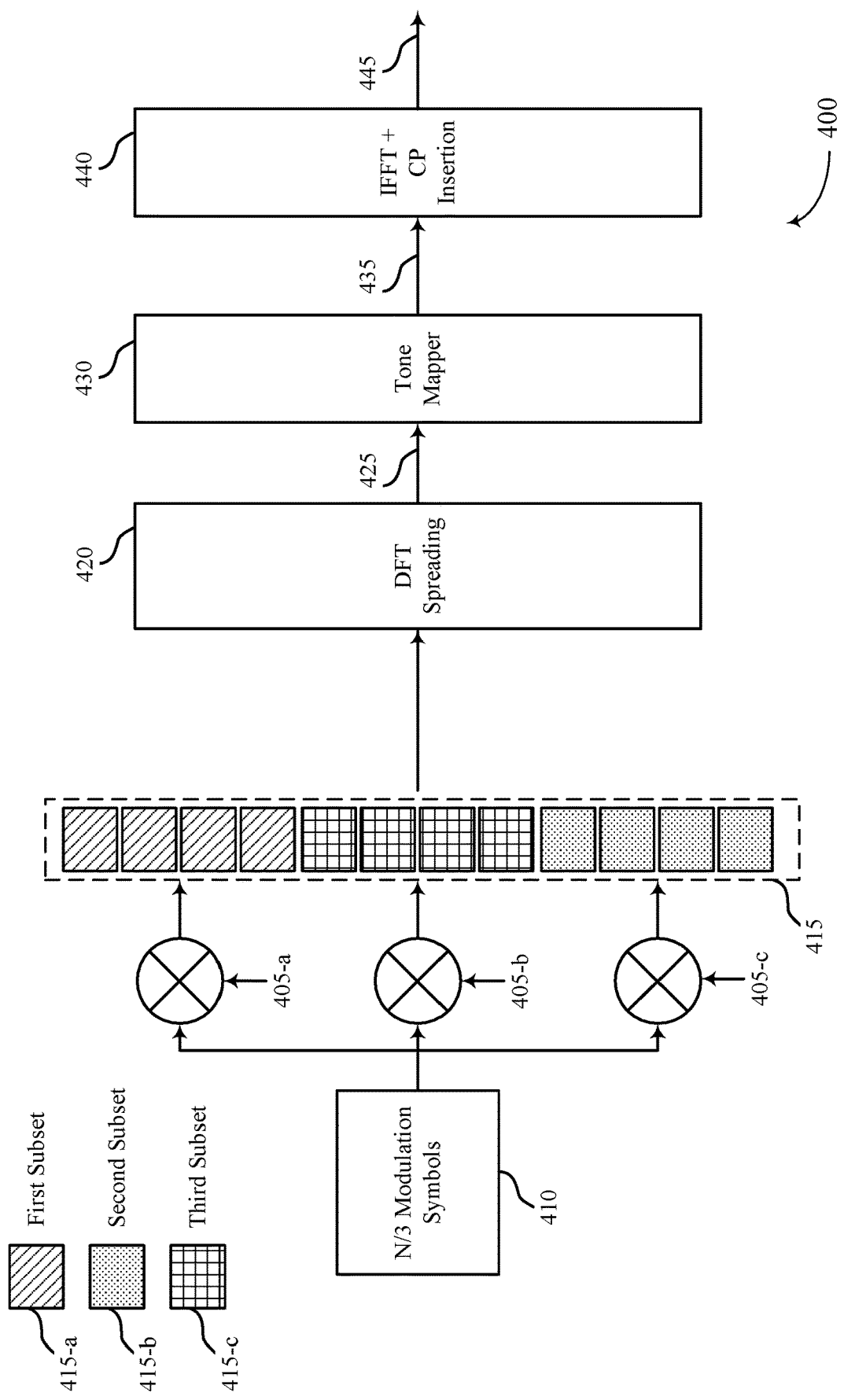

FIG. 4 illustrates symbol generation 400 for an OFDM symbol for user multiplexing for UCI in accordance with various aspects of the present disclosure. In some examples, symbol generation 400 illustrates symbol generation for one OFDM symbol of FIG. 2 for a UE k using an OCC 405 of length 3 over one resource block having N tones (e.g., 12 tones). As described above with reference to FIG. 2, the OCC length of 3 may be based on the number of UEs that may utilize the resource block for communications.

In the example symbol generation 400, N/3 modulation symbols 410 of control information are repeated three times to make three sets of N/3 modulation symbols and multiplied by first, second, and third scalars 405-a, 405-b, and 405-c of a length three OCC 405, respectively to obtain a set of spread modulation symbols 415 including three subsets of spread modulation symbols 415. The first, second, and third scalars 405-a, 405-b, and 405-c may correspond to an OCC sequence [A(k,1), A(k,2), A(k,3)], where the first UE is associated with the sequence index k, and sequences having different indices k are orthogonal from each other. For example, the OCC sequence [A(1,1), A(1,2), A(1, 3)] for a first UE 115 (e.g., k=1) will be different (e.g., orthogonal) from the OCC sequence [A(2,1), A(2,2), A(2,3)] for a second UE 115 (e.g., k=2), and from the OCC sequence [A(3,1), A(3,2), A(3,3)] for a third UE 115 (e.g., k=3).

Each modulation symbol 410 for a first UE (e.g., k=1) may be multiplied by OCC 405-a (e.g., A(k,1)), by OCC 405-b (e.g., A(k,2)), and by OCC 405-c (e.g., A(k,3)) to obtain the set of spread modulation symbols 415 including subsets of modulation symbols 415-a, 415-b, and 415-c multiplied by different scalars of the OCC 405. A second UE 115 (e.g., k=2) may perform the same OCC processing to its set of modulation symbols 410 using its respective OCC sequence (e.g., OCC sequence [A(2,1), A(2,2), A(2,3)]), and a third UE 115 (e.g., k=3) may perform the same OCC processing to its set of modulation symbols 410 using its respective OCC sequence (e.g., OCC sequence [A(3,1), A(3,2), A(3,3)]).

At 420, UEs 115 may perform DFT spreading on the set of spread modulation symbols 415 to obtain frequency domain symbols 425. The UEs 115 may map the generated frequency domain symbols 425 to tones (e.g., or subchannels or subcarriers) of a resource block at 430. The UEs 115, during 440, may then perform an IFFT and CP insertion on the mapped symbols 435 generated at 430, to produce a DFT-s-OFDM symbol waveform 445 for transmission in one symbol period.

Figure 5:
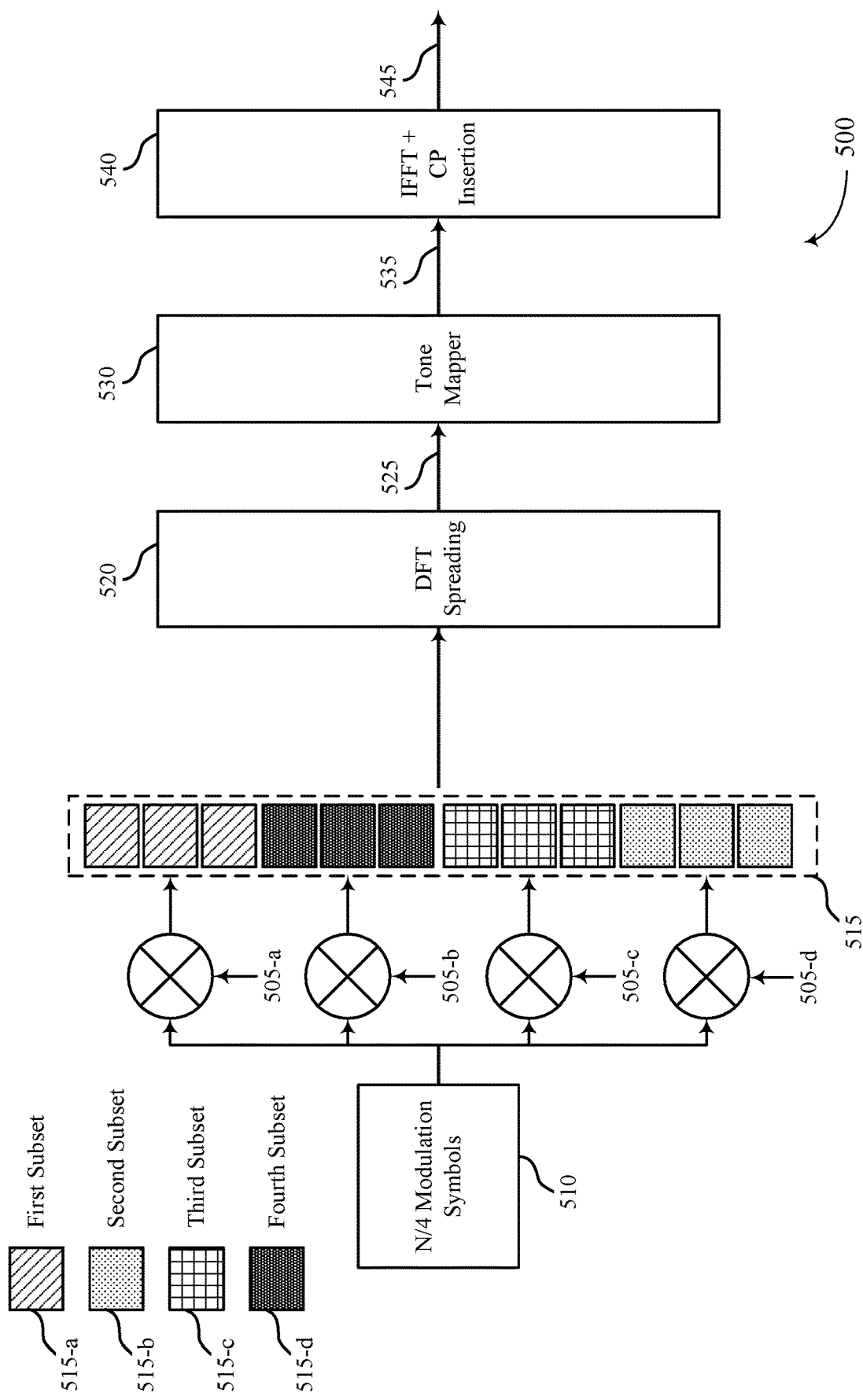

FIG. 5 illustrates symbol generation 500 for an OFDM symbol for user multiplexing for UCI in accordance with various aspects of the present disclosure. In some examples, symbol generation 500 illustrates symbol generation for one OFDM symbol of FIG. 2 for a UE k using an OCC 505 of length 4 over one resource block having N tones (e.g., 12 tones). As described above with reference to FIG. 2, the OCC length of 4 may be based on the number of UEs that may utilize the resource block for communications.

In the example symbol generation 500, N/4 modulation symbols of control information are repeated four times to make four sets of N/4 modulation symbols and multiplied by first, second, third, and fourth scalars 505-a, 505-b, 505-c, and 505-d of a length four OCC 505, respectively to obtain a set of spread modulation symbols 515 including four subsets of spread modulation symbols 515. The first, second, third, and fourth scalars 505-a, 505-b, 505-c, and 505-d may correspond to an OCC sequence [A(k,1), A(k,2), A(k,3), A(k,4)], where the first UE is associated with the sequence index k, and sequences having different indices k are orthogonal from each other. For example, the OCC sequence [A(1,1), A(1,2), A(1, 3), A(1, 4)] for a first UE 115 (e.g., k=1) will be different (e.g., orthogonal) from the OCC sequence [A(2,1), A(2,2), A(2,3), A(2,4)] for a second UE 115 (e.g., k=2), from the OCC sequence [A(3,1), A(3,2), A(3,3), A(3,4)] for a third UE 115 (e.g., k=3), and from the OCC sequence [A(4,1), A(4,2), A(4, 3), A(4, 4)] for a fourth UE 115 (e.g., k=4).

Each modulation symbol 510 for a first UE 115 (e.g., k=1) may be multiplied by OCC 505-a (e.g., A(k,1)), by OCC 505-b (e.g., A(k,2)), by OCC 505-c (e.g., A(k,3)), and by OCC 505-d (e.g., A(k,4)) to obtain the set of spread modulation symbols 515 including subsets of modulation symbols 515-a, 515-b, 515-c, and 515-d multiplied by different scalars of the OCC 505. A second UE 115 (e.g., k=2) may perform the same OCC processing to its set of modulation symbols 510 using its respective OCC sequence (e.g., OCC sequence [A(2,1), A(2,2), A(2,3)], A(2,4)), a third UE 115 (e.g., k=3) may perform the same OCC processing to its set of modulation symbols 510 using its respective OCC sequence (e.g., OCC sequence [A(3,1), A(3,2), A(3,3)], A(3,4)), and a fourth UE 115 (e.g., k=4) may perform the same OCC processing to its set of modulation symbols 510 using its respective OCC sequence (e.g., OCC sequence [A(3,1), A(3,2), A(3,3)], A(3,4)).

At 520, UEs 115 may perform DFT spreading on the set of spread modulation symbols 515 to obtain frequency domain symbols 525. The UEs 115 may map the generated frequency domain symbols 525 to tones (e.g., or subchannels or subcarriers) of a resource block at 530. The UEs 115, during 540, may then perform an IFFT and CP insertion on the mapped symbols 535 generated at 530, to produce a DFT-s-OFDM symbol 545 for transmission in one symbol period.

Referring back to FIGS. 2 through 5, a desired property in the OCC design is that spreading sequences for different UEs 115 may be orthogonal in the time domain. For example, if two UEs 115 are scheduled, the first UE 115 may have a spreading sequence of [1, 1], where the entries of the spreading sequence correspond to A(1,1) and A(1,2), and the second UE 115 may have a spreading sequence of [1, −1], where the respective entries of the spreading sequence correspond to A(2,1) and A(2,2). In some other examples, if three UEs 115 are scheduled, the first UE 115 may have a spreading sequence of [1, 1, 1], where the respective entries of the spreading sequence correspond to A(1,1) and A(1,2) and A(1, 3). The second UE 115 may have a spreading sequence of [1, exp(i*2*pi/3), exp(i*4*pi/3)], where the respective entries of the spreading sequence correspond to A(2,1), A(2,2), and A(2,3), and the third UE 115 may have a spreading sequence of [1, exp(i*4*pi/3), exp(i*8*pi/3)], where the respective entries of the spreading sequence correspond to A(3,1), A(3,2), and A(3,3). Generally, fork UEs 115, the first UE 115 may have a spreading sequence of [1, 1, . . . , 1, 1], the second UE 115 may have a spreading sequence of [1, exp(i*2*pi/k), 1, exp(i*2*pi/k*2), . . . , 1, exp(i*2*pi/k*(k−1))], and, generally, the kth UE 115 may have a spreading sequence of [1, exp(i*2*pi/k*(k−1)), 1, exp(i*2*pi/k*(k−1)*2), . . . , 1, exp(i*2*pi/k*(k−1)*(k−1))]. In some cases, the nth entry or index of the spreading sequence for the kth UE 115 corresponds to A(k,n). After DFT spreading, different UEs 115 scheduled by the base station may use different tones in the frequency domain. These are examples, and other examples may be permutations including rotations or scalings of these sequences.

Figure 6:
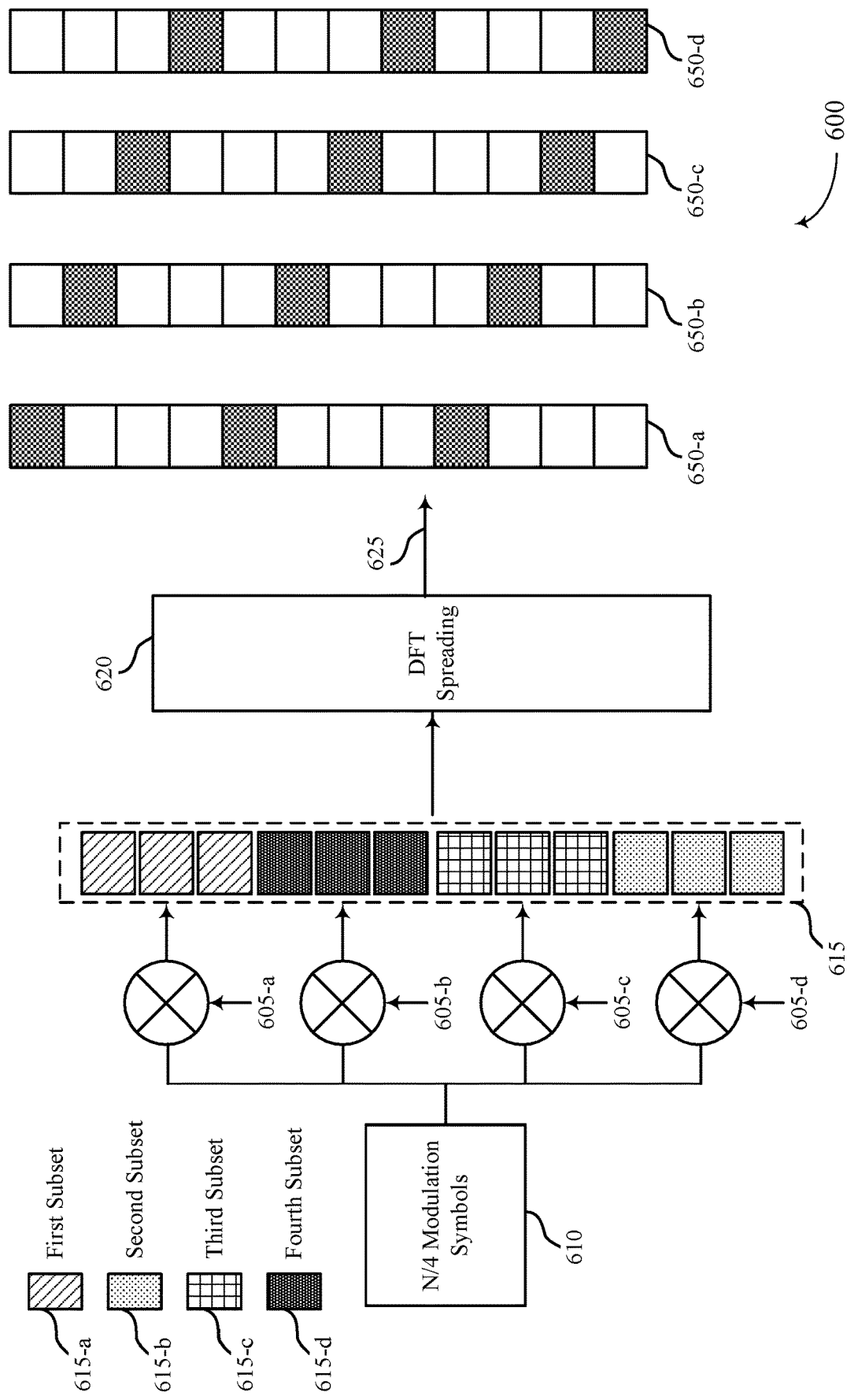

FIG. 6 illustrates symbol generation 600 for an OFDM symbol for user multiplexing for UCI in accordance with various aspects of the present disclosure. In some examples, symbol generation 600 illustrates symbol generation for one OFDM symbol of FIG. 2 using an OCC 605 of length 4 over one resource block having N tones (e.g., 12 tones). As described above with reference to FIG. 2, the OCC length of 4 may be based on the number of UEs that may utilize the resource block for communications.

Symbol generation 600 illustrates OCCs 605 chosen as Fourier basis OCCs 605. For example, Fourier basis OCCs 605 with length four (e.g., for four UEs 115) may be [1, 1, 1, 1] for a first UE 115 (e.g., UE1), [1, j, −1, −j] for a second UE 115 (e.g., UE2), [1, −1, 1, −1] for a third UE 115 (e.g., UE3), and [1, −j, −1, j] for a fourth UE 115 (e.g., UE4). As illustrated in FIG. 6, Each UE 115 (e.g., UE1, UE2, UE3, and UE4) may only occupy ¼ of the tones of the RB. Thus, the UEs 115 are frequency division multiplexed within the RB.

In the example symbol generation 600, N/4 modulation symbols of control information 610 are repeated four times to make four sets of N/4 modulation symbols and multiplied by first, second, third, and fourth scalars 605-*a*, 605-*b*, 605-*c*, and 605-*d* of a length four OCC 605, respectively to obtain a set of spread modulation symbols 615 including four subsets of spread modulation symbols 615. The first, second, third, and fourth scalars 605-*a*, 605-*b*, 605-*c*, and 605-*d* may correspond to an OCC sequence [A(k,1), A(k,2), A(k,3), A(k,4)], where the first UE is associated with the sequence index k, and sequences having different indices k are orthogonal from each other. For example, the OCC sequence [A(1,1), A(1,2), A(1, 3), A(1,4)] for a first UE 115 (e.g., k=1) will be different (e.g., orthogonal) from the OCC sequence [A(2,1), A(2,2), A(2,3), A(2,4)] for a second UE 115 (e.g., k=2), from the OCC sequence [A(3,1), A(3,2), A(3,3), A(3,4)] for a third UE 115 (e.g., k=3), and from the OCC sequence [A(4,1), A(4,2), A(4, 3), A(4,4)] for a fourth UE 115 (e.g., k=4).

Each modulation symbol for a first UE 115 (e.g., k=1) may be multiplied by OCC 605-*a* (e.g., A(k,1)), by OCC 505-*b* (e.g., A(k,2), which may be 1 for the first UE), by OCC 505-*c* (e.g., A(k,3)), and by OCC 505-*d* (e.g., A(k,4)) to obtain the set of spread modulation symbols 610 including subsets of modulation symbols 615-*a*, 615-*b*, 615-*c*, and 615-*d* multiplied by different scalars of the OCC 605. A second UE 115 may perform the same OCC processing to its set of modulation symbols using its respective OCC sequence (e.g., OCC sequence [A(2,1), A(2,2), A(2,3)], A(2,4)), a third UE 115 may perform the same OCC processing to its set of modulation symbols using its respective OCC sequence (e.g., OCC sequence [A(3,1), A(3,2), A(3, 3)], A(3,4)), and a fourth UE 115 may perform the same OCC processing to its set of modulation symbols using its respective OCC sequence (e.g., OCC sequence [A(3,1), A(3,2), A(3,3)], A(3,4)).

In the example of the first UE 115 with an OCC 605 of [1, 1, 1, 1], OCC 605-*a* may correspond to a first scalar (e.g., 1), OCC 605-*b* may correspond to a second scalar (e.g., 1), OCC 605-*c* may correspond to a third scalar (e.g., 1), and OCC 605-*d* may correspond to a fourth scalar (e.g., 1).

In the example of the second UE 115 with an OCC 605 of [1, j, −1, −j], OCC 605-*a* may correspond to a first scalar (e.g., 1), OCC 605-*b* may correspond to a second scalar (e.g., j), OCC 605-*c* may correspond to a third scalar (e.g., −1), and OCC 605-*d* may correspond to a fourth scalar (e.g., −j).

In the example of the third UE 115 with an OCC 605 of [1, −1, 1, −1], OCC 605-*a* may correspond to a first scalar (e.g., 1), OCC 605-*b* may correspond to a second scalar (e.g., −1), OCC 605-*c* may correspond to a third scalar (e.g., 1), and OCC 605-*d* may correspond to a fourth scalar (e.g., −1).

In the example of the fourth UE 115 with an OCC 605 of [1, −j, −1, j], OCC 605-*a* may correspond to a first scalar (e.g., 1), OCC 605-*b* may correspond to a second scalar (e.g., −j), OCC 605-*c* may correspond to a third scalar (e.g., −1), and OCC 605-*d* may correspond to a fourth scalar (e.g., −j).

Alternatively, a Hadamard matrix based design may be used for the OCCs. For example, a length 2 Hadamard matrix based design may assign OCCs 605 as UE1=[1,1], UE2=[1, −1]. A length 4 Hadamard matrix based design may assign OCCs 605 as [1, 1, 1, 1] for a first UE (e.g., UE1), [1, −1, 1, −1] for a second UE 115 (e.g., UE2), [1, −1, −1, 1] for a third UE 115 (e.g., UE3), [1, 1, −1, −1] for a fourth UE 115 (e.g., UE4). This may result in orthogonality of the multiplexed UCI in the time domain, but different UEs 115 will not be multiplexed in the frequency domain (e.g., UE3 and UE4 will be mapped to common tones). A UE 115 may apply a Hadamard matrix based OCC 605 to modulation symbols in a similar manner as described above with reference to the processing of Fourier basis OCCs 605.

At 620, UEs 115 may perform DFT spreading on the set of spread modulation symbols 615 to obtain frequency domain symbols 625. The UEs 115 may map the generated frequency domain symbols 625 to tones (e.g., or subchannels or subcarriers) of a resource block as shown in FIG. 5. The UEs 115 may then perform an IFFT and CP insertion on the mapped symbols to produce a DFT-s-OFDM symbol for transmission in one symbol period.

For example, the DFT-s-OFDM waveform of UE1 may occupy tone set 650-*a* such that the modulation symbols of UE1 are spread to every fourth tone of a resource block. The DFT-s-OFDM waveform of UE2 may occupy tone set 650-*b* such that the modulation symbols of UE2 are spread to every fourth tone of a resource block and offset by one tone from tone set 650-*a*. The DFT-s-OFDM waveform of UE3 may occupy tone set 650-*c* such that the modulation symbols of UE3 are spread to every fourth tone of a resource block and offset by two tones from tone set 650-*a*. The DFT-s-OFDM waveform of UE4 may occupy tone set 650-*d* such that the modulation symbols of UE4 are spread to every fourth tone of a resource block and offset by three tones from tone set 650-*a*.

Figure 7:
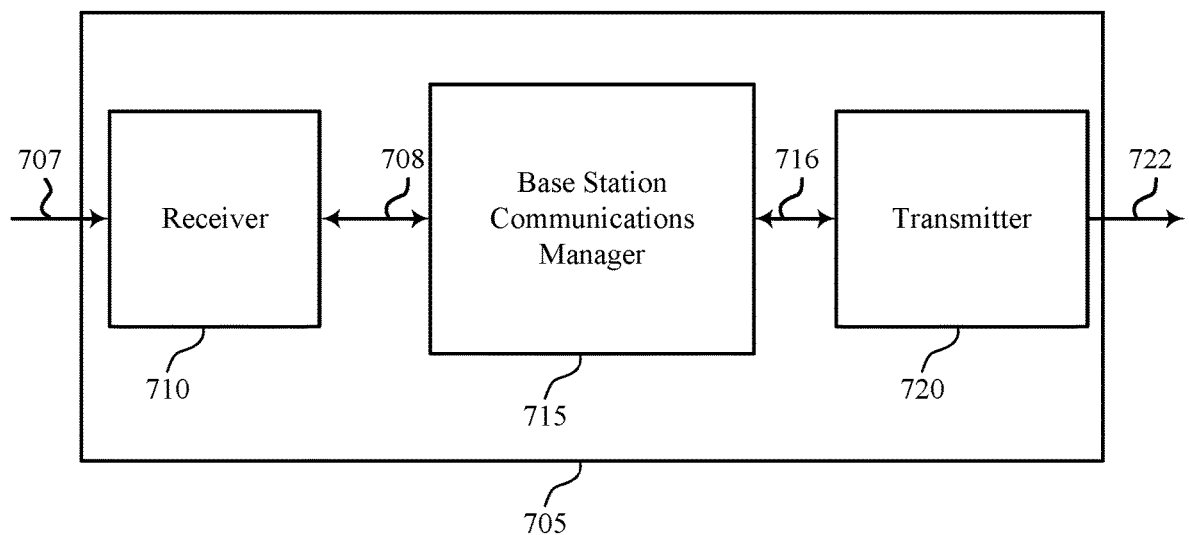
FIGS. 7 through 9 show block diagrams of a device that supports user multiplexing for uplink control information in accordance with aspects of the present disclosure.

FIG. 7 shows a block diagram 700 of a wireless device 705 that supports user multiplexing for UCI in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive signaling 707 such as packets, user data, or control information associated with various information channels (e.g., control channels, data channels, and information related to user multiplexing for UCI). Receiver may perform processing on signaling 707 to generate information 708, and pass on information 708 to other components of the device. The receiver 710 may be an example of aspects of the transceiver 1035 described with reference to FIG. 10. The receiver 710 may utilize a single antenna or a set of antennas.

In some cases, information 708 may be one or more of a UE configuration, a plurality of possible spreading codes, or multiplexed uplink transmissions. A UE configuration may indicate a set of UEs from which receiver 710 may receive a plurality of multiplexed uplink transmissions. A set of possible spreading codes may indicate a plurality of spreading codes that the wireless device 705 may configure to one or more UEs. Receiver 710 may receive a plurality of multiplexed uplink transmissions from one or more UEs.

Base station communications manager 715 may be an example of aspects of the base station communications manager 1015 described with reference to FIG. 10.

Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Based on receiving information 708 (e.g., UE configuration information and a plurality of possible spreading codes), base station communications manager 715 may schedule, at a base station, a set of UEs for transmitting respective UCI within a first set of frequency resources of an uplink slot and configure each of the set of UEs to spread modulation symbols of the respective UCI using a set of respective spreading codes prior to performing a DFT spreading process, where the set of respective spreading codes include orthogonal cover codes.

Based on receiving information 708 (e.g., a plurality multiplexed uplink transmissions), base station communications manager 715 may perform a DFT process on the plurality of multiplexed uplink transmissions, demap the plurality of multiplexed uplink transmissions, and despread the plurality of multiplexed uplink transmissions according to the plurality of respective spreading codes to obtain the respective UCI.

In some cases, base station communications manager 715 may indicate configuration information 716 to transmitter 720, where configuration information 716 may include scheduling configuration information and a plurality of spreading codes.

Transmitter 720 may transmit signals 722 generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

In some cases, signals 722 may include a scheduling configuration that indicates which UEs may be scheduled for uplink transmissions. Signals 722 may include a plurality of spreading codes that may be used by the scheduled UEs to modulate uplink transmissions.

Figure 8:
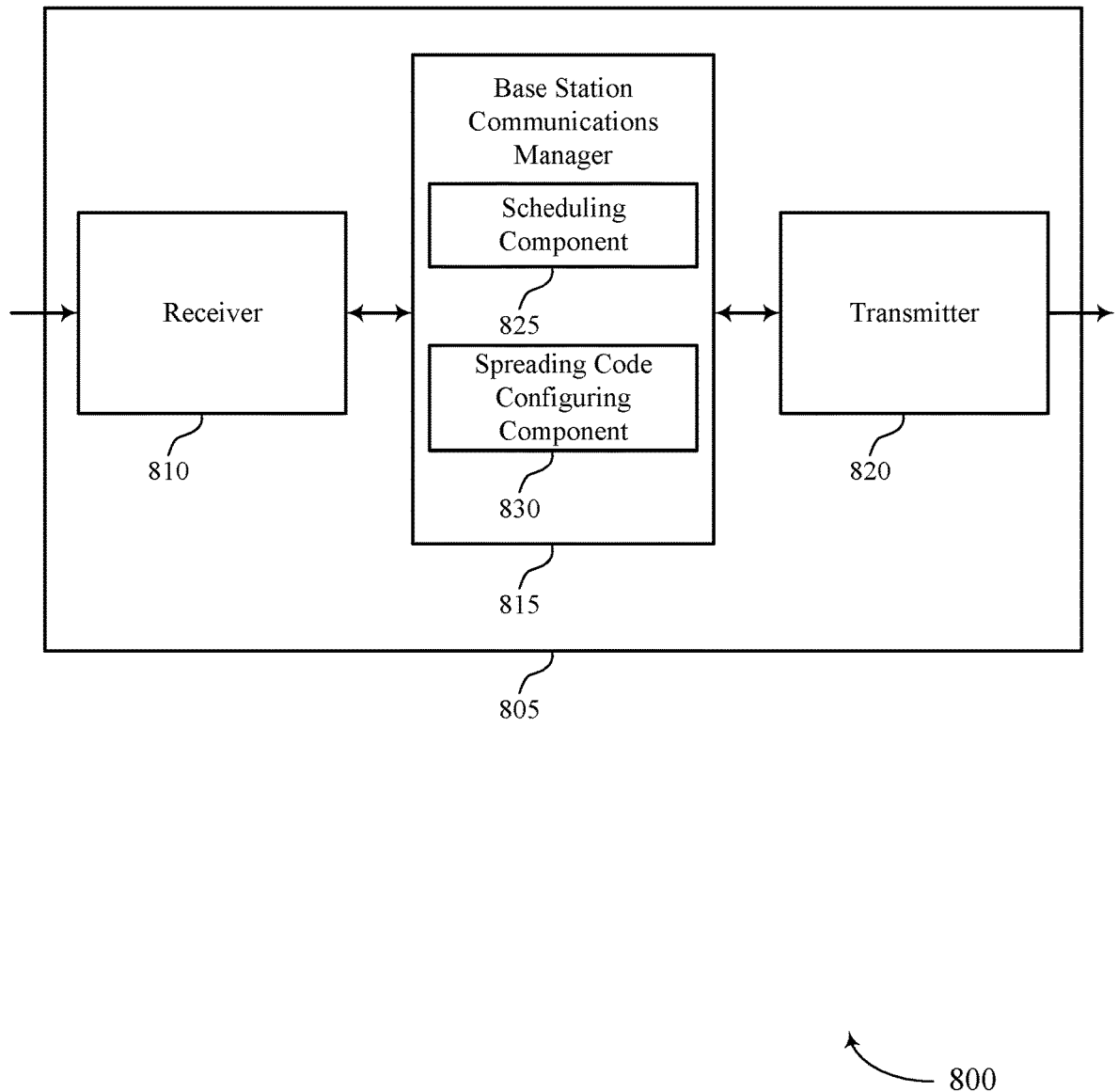

FIG. 8 shows a block diagram 800 of a wireless device 805 that supports user multiplexing for UCI in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to user multiplexing for UCI). Information may be passed on to other components of the device. The receiver 810 may be an example of aspects of the transceiver 1035 described with reference to FIG. 10. The receiver 810 may utilize a single antenna or a set of antennas.

Base station communications manager 815 may schedule, at a base station, a set of UEs for transmitting respective UCI within a first set of frequency resources of an uplink slot and transmit, to each of the set of UEs, a configuration to spread modulation symbols of the respective UCI using a set of respective spreading codes prior to performing a DFT spreading process, where the set of respective spreading codes include orthogonal cover codes. Base station communications manager 815 may be an example of aspects of the base station communications manager 1015 described with reference to FIG. 10.

Base station communications manager 815 may also include scheduling component 825 and spreading code configuring component 830.

Scheduling component 825 may schedule, at a base station, a set of UEs for transmitting respective UCI within a first set of frequency resources of an uplink slot.

Spreading code configuring component 830 may configure each of the set of UEs to spread modulation symbols of the respective UCI using a set of respective spreading codes prior to performing a DFT spreading process, where the set of respective spreading codes include orthogonal cover codes. In some cases, the respective spreading codes may be selected such that uplink transmissions from different ones of the plurality of UEs are orthogonal in the frequency domain after the DFT process. In some cases, the frequency domain orthogonality may include frequency division multiplexing of the uplink transmissions from the different ones of the plurality of UEs. In some cases, the respective spreading codes are Fourier basis orthogonal cover codes. In some cases, the respective spreading codes are Hadamard matrix based orthogonal cover codes.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
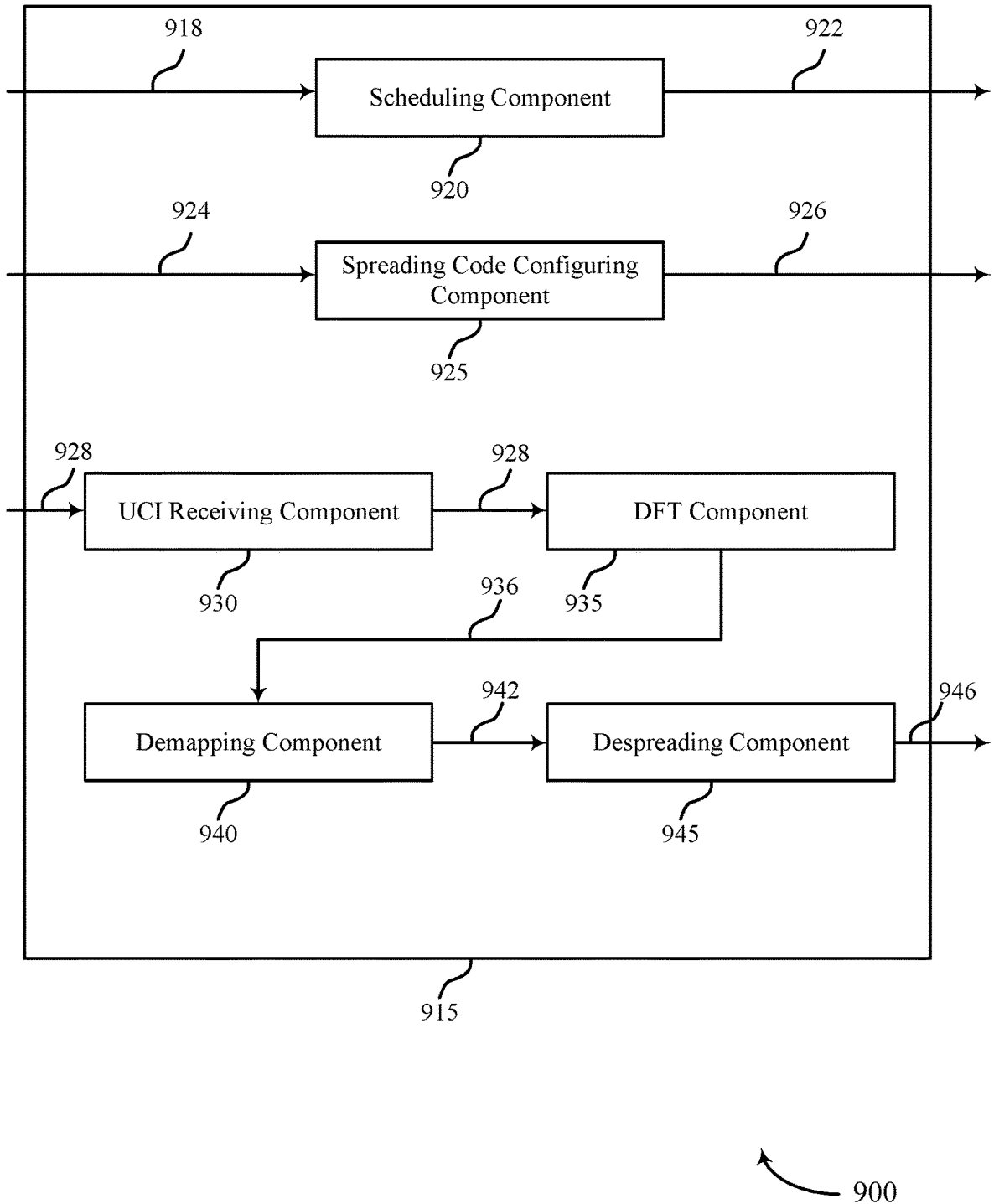

FIG. 9 shows a block diagram 900 of a base station communications manager 915 that supports user multiplexing for UCI in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include scheduling component 920, spreading code configuring component 925, UCI receiving component 930, DFT component 935, demapping component 940, and despreading component 945. Each of these modules may communicate, directly or indirectly, with one another (e.g., via one or more buses).

Upon receiving a UE configuration 918 that indicates a set of UEs, scheduling component 920 may schedule, at a base station, the set of UEs for transmitting respective UCI within a first set of frequency resources of an uplink slot. Scheduling component 920 may transmit a scheduling configuration 922 to the UEs based on the scheduled frequency resources.

Spreading code configuring component 925 may determine (e.g., or be configured with) a set of possible spreading codes 924. Spreading code configuring component 925 may configure each of the set of UEs to spread modulation symbols of the respective UCI using a set of respective spreading codes 926 prior to performing a DFT spreading process, where the set of respective spreading codes 926 include orthogonal cover codes. In some cases, the respective spreading codes are Fourier basis orthogonal cover codes. In some cases, the respective spreading codes are Hadamard matrix based orthogonal cover codes. In some cases, the respective spreading codes may be selected such that uplink transmissions from different ones of the plurality of UEs are orthogonal in the frequency domain after the DFT process. In some cases, the frequency domain orthogonality may include frequency division multiplexing of the uplink transmissions from the different ones of the plurality of UEs. Spreading code configuring component 925 may transmit the respective spreading codes 926 based on the set of possible spreading codes 924.

UCI receiving component 930 may receive, over the first set of frequency resources of the uplink slot, a set of multiplexed uplink transmissions 928 from the set of UEs including the respective UCI. UCI receiving component 930 may forward the set of multiplexed uplink transmissions 928 to DFT component 935.

DFT component 935 may perform a DFT process on the set of multiplexed uplink transmissions. DFT component 935 may transform the set of multiplex uplink transmissions into symbols 936. Demapping component 940 may demap the set of multiplexed uplink transmissions. Demapping component 940 may demodulate symbols 936 into demapped symbols 942. Despreading component 945 may despread the set of multiplexed uplink transmissions according to the set of respective spreading codes to obtain the respective UCI. In some cases, despreading component 945 may despread demapped symbols 942 in accordance with a spreading process as performed by the set of UEs to recover the uplink information 946 transmitted by the set of UEs. In some cases, such a despreading process may involve extracting bits (e.g., or symbols) from one or more of the frequency domain or the time domain.

Figure 10:
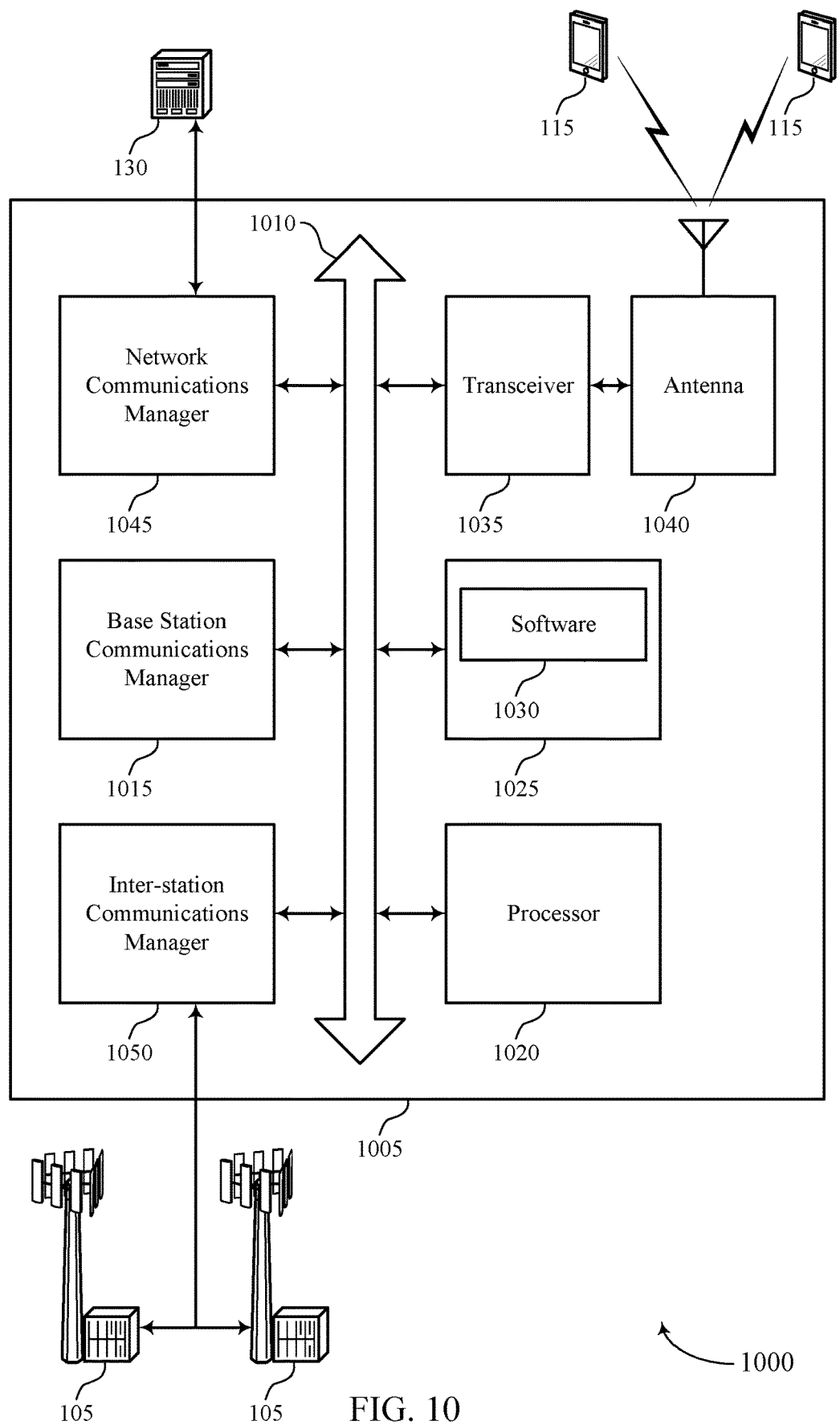
FIG. 10 illustrates a block diagram of a system including a base station that supports user multiplexing for uplink control information in accordance with aspects of the present disclosure.

FIG. 10 shows a diagram of a system 1000 including a device 1005 that supports user multiplexing for UCI in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting user multiplexing for UCI).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support user multiplexing for UCI. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
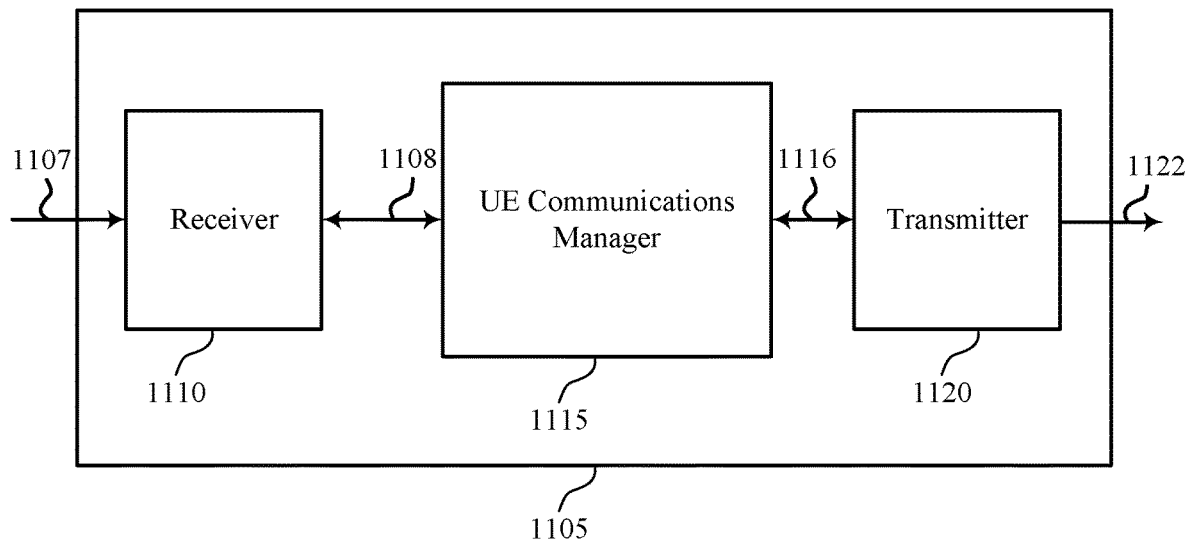
FIGS. 11 through 13 show block diagrams of a device that supports user multiplexing for uplink control information in accordance with aspects of the present disclosure.

FIG. 11 shows a block diagram 1100 of a wireless device 1105 that supports user multiplexing for UCI in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive signaling 1107 such as packets, user data, or control information associated with various information channels (e.g., control channels, data channels, and information related to user multiplexing for UCI). Receiver 1110 may process signaling 1107 and generate information 1108 that may be passed on to other components of the device. The receiver 1110 may be an example of aspects of the transceiver 1335 described with reference to FIG. 13. The receiver 1110 may utilize a single antenna or a set of antennas.

In some cases, information 1108 may be one or more of a set of spreading codes as indicated by a base station. In some cases, information 1108 may include a set of modulation symbols.

UE communications manager 1115 may be an example of aspects of the UE communications manager 1315 described with reference to FIG. 13.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Based on receiving information 1108, UE communications manager 1115 may identify a spreading code of a set of spreading codes for spreading modulation symbols of UCI, identify a set of modulation symbols of the UCI for a symbol period of an uplink slot, spread the set of modulation symbols using the spreading code prior to a DFT spreading process, the DFT spreading process generating a set of frequency domain symbols, map the set of frequency domain symbols to a set of subcarriers associated with a set of frequency resources assigned to the UE for the UCI, perform an inverse discrete Fourier transform on the mapped set of frequency domain symbols to obtain a time-domain waveform 1116 for the UCI, and transmit the time-domain waveform 1116 for the UCI to a serving base station.

Transmitter 1120 may transmit signals 1122 generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas. In some cases, signals 1122 may include the time-domain waveform 1116 for the UCI.

Figure 12:
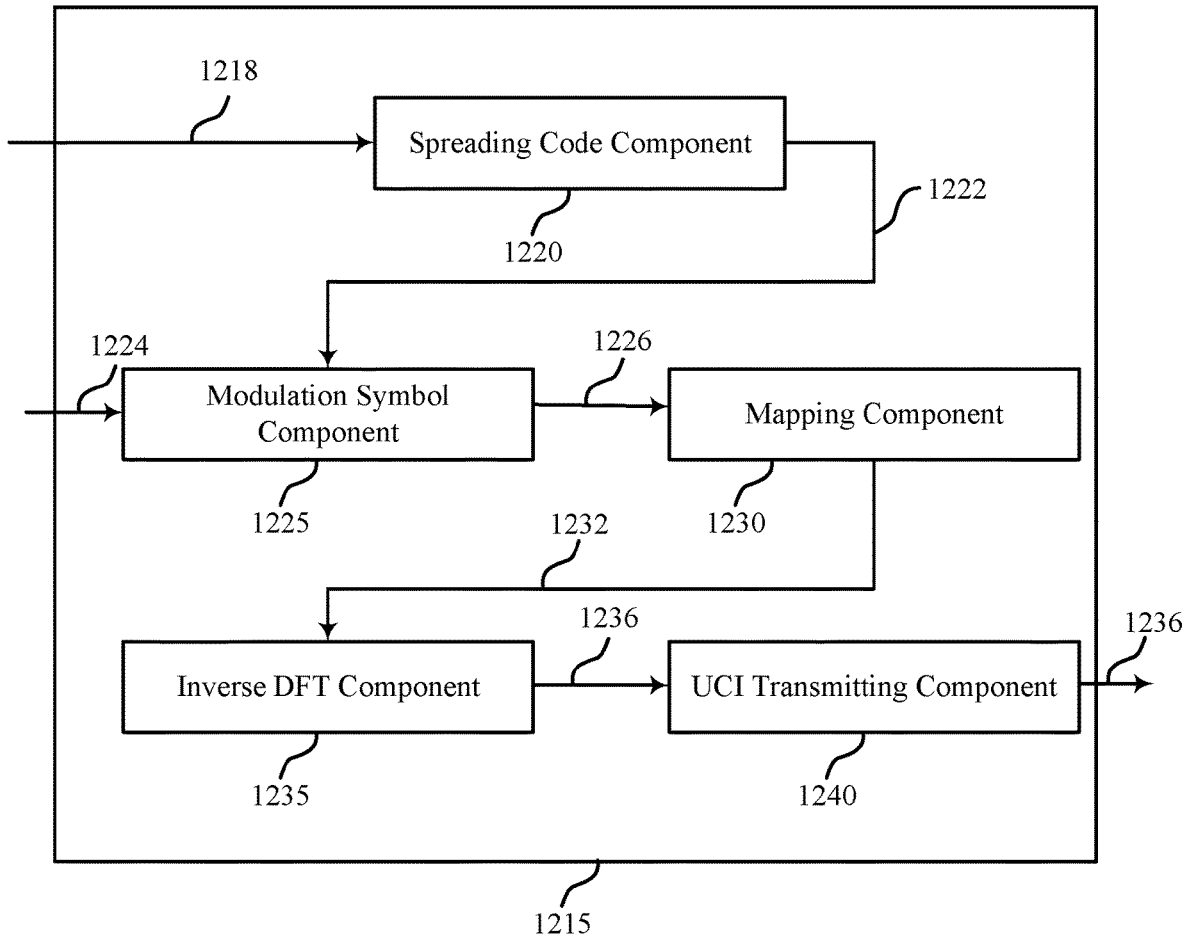

FIG. 12 shows a block diagram 1200 of a UE communications manager 1215 that supports user multiplexing for UCI in accordance with aspects of the present disclosure. The UE communications manager 1215 may be an example of aspects of a UE communications manager 1315 described with reference to FIGS. 11 and 13. The UE communications manager 1215 may include spreading code component 1220, modulation symbol component 1225, mapping component 1230, inverse DFT component 1235, and UCI transmitting component 1240. Each of these modules may communicate, directly or indirectly, with one another (e.g., via one or more buses).

Spreading code component may receive (e.g., or be configured with) a set of spreading codes 1218. Spreading code component 1220 may identify a spreading code 1222 of the set of spreading codes 1218 for spreading modulation symbols of UCI and spread the set of modulation symbols using the spreading code prior to a DFT spreading process, the DFT spreading process generating a set of frequency domain symbols. In some cases, the set of spreading codes 1218 include orthogonal cover codes. In some cases, the spreading code 1222 is applied to each modulation symbol of the set of modulation symbols. In some examples, the spreading code 1222 is a Fourier basis orthogonal cover code. In some instances, the spreading code 1222 is a Hadamard matrix based orthogonal cover code. In some examples, the spreading code component 1220 may spread a second set of modulation symbols using a scalar of the spreading code prior to the DFT spreading process. In some examples, a spreading code 1222 may comprise one or more scalars (e.g., 1, −1, j, or −j).

Modulation symbol component 1225 may identify a set of modulation symbols 1224 of the UCI for a symbol period of an uplink slot. Modulation symbol component 1225 may modulate the modulation symbols 1224 to a set of frequency domain symbols 1226 according to spreading code 1222. Mapping component 1230 may map the set of frequency domain symbols 1226 to a set of subcarriers associated with a set of frequency resources assigned to the UE for the UCI. Inverse DFT component 1235 may perform an inverse discrete Fourier transform on the mapped set of frequency domain symbols 1232 to obtain a time-domain waveform 1236 for the UCI. UCI transmitting component 1240 may transmit the time-domain waveform 1236 for the UCI to a serving base station. In some examples, the modulation symbol component 1225 may identify a second set of modulation symbols of the UCI for the symbol of the uplink slot. In some cases, the second set of modulation symbols is the same as the set of modulation symbols.

Figure 13:
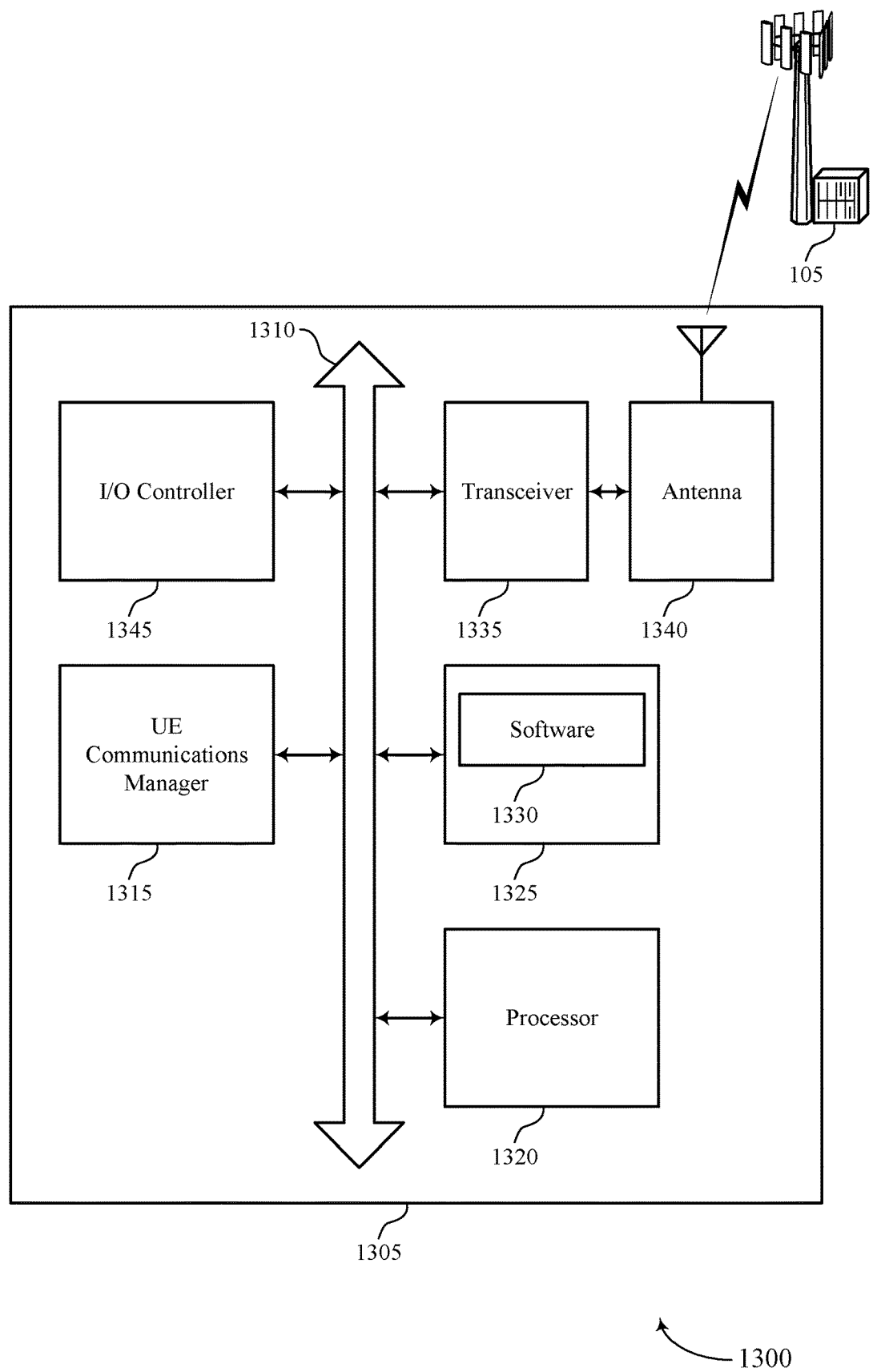

FIG. 13 shows a diagram of a system 1300 including a device 1305 that supports user multiplexing for UCI in accordance with aspects of the present disclosure. Device 1305 may be an example of or include the components of UE 115 as described above, e.g., with reference to FIG. 1. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting user multiplexing for UCI).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support user multiplexing for UCI. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
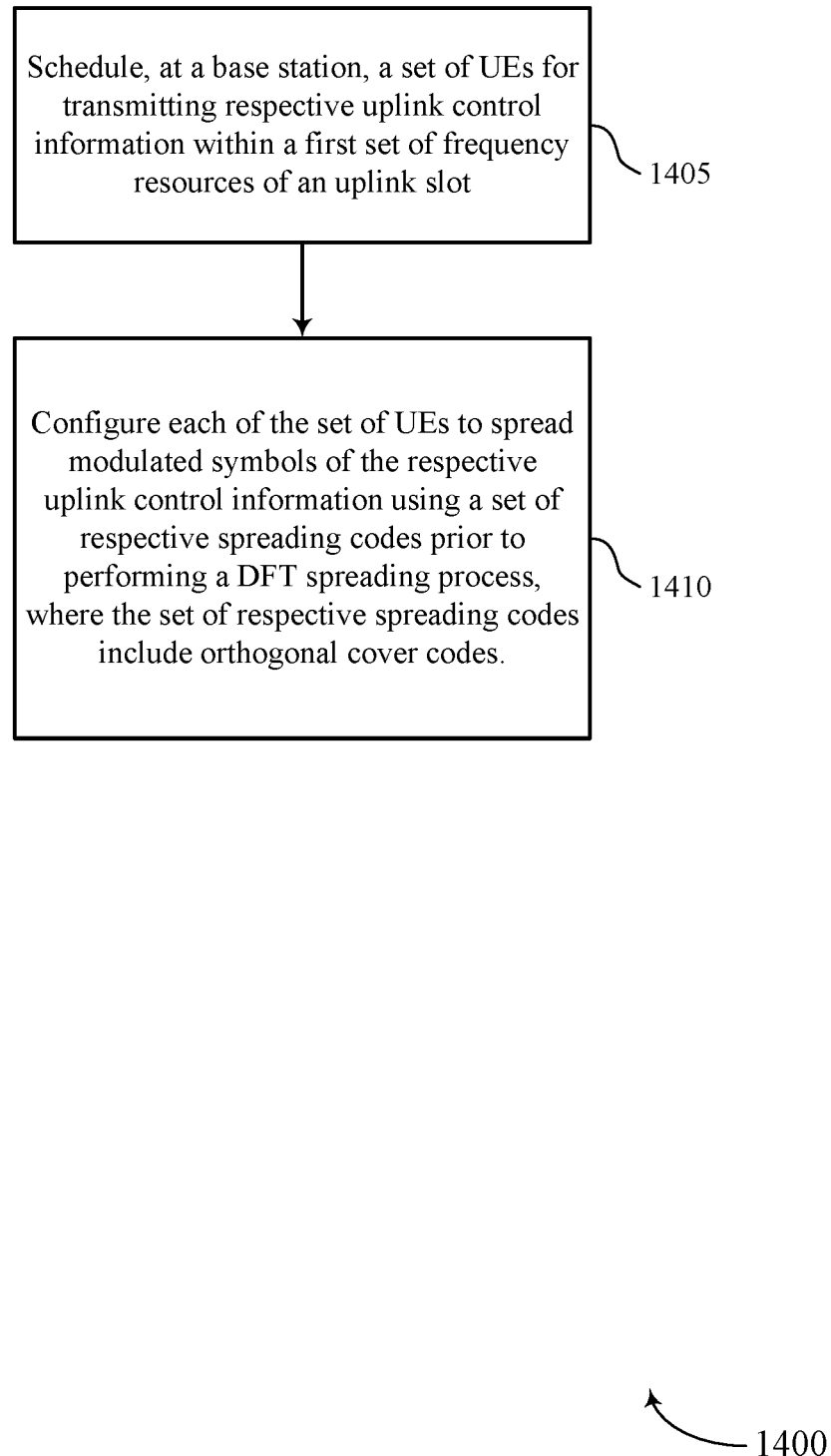
FIG. 14 illustrates a block diagram of a system including a UE that supports user multiplexing for uplink control information in accordance with aspects of the present disclosure.

FIG. 14 shows a flowchart illustrating a method 1400 for user multiplexing for UCI in accordance with aspects of the present disclosure. The operations of method 1400 may be implemented by a base station 105 or its components as described herein. For example, the operations of method 1400 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may schedule, at a base station, a plurality of UEs for transmitting respective UCI within a first set of frequency resources of an uplink slot. The operations of block 1405 may be performed according to the methods described herein. In certain examples, aspects of the operations of block 1405 may be performed by a scheduling component as described with reference to FIGS. 7 through 10.

At block 1410 the base station 105 may configure each of the plurality of UEs to spread modulation symbols of the respective UCI using a plurality of respective spreading codes prior to performing a DFT spreading process, wherein the plurality of respective spreading codes comprise orthogonal cover codes. The operations of block 1410 may be performed according to the methods described herein. In certain examples, aspects of the operations of block 1410 may be performed by a spreading code configuring component as described with reference to FIGS. 7 through 10.

Figure 15:
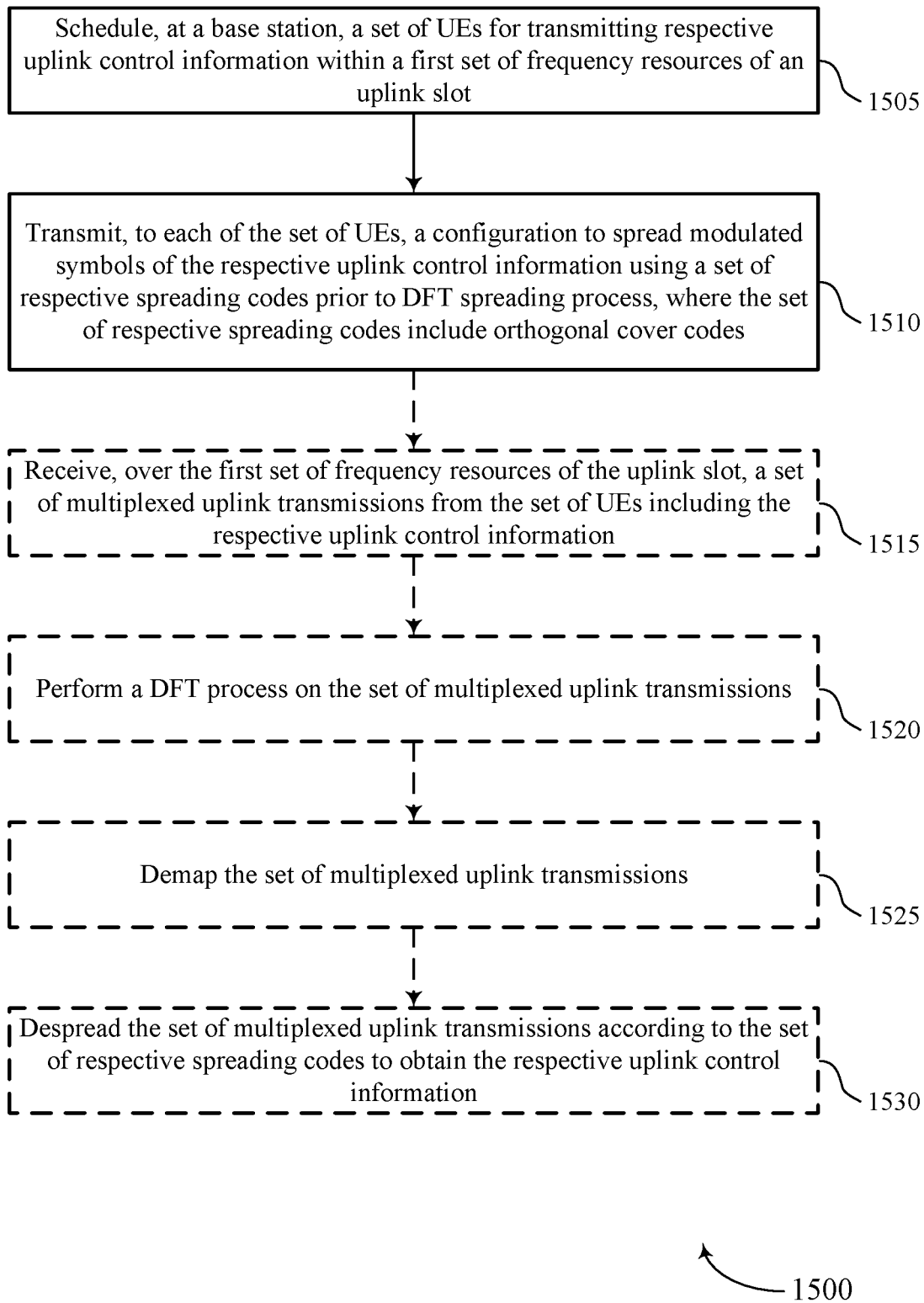
FIGS. 15 through 16 illustrate methods for user multiplexing for uplink control information in accordance with aspects of the present disclosure.

FIG. 15 shows a flowchart illustrating a method 1500 that supports user multiplexing for UCI in accordance with aspects of the present disclosure. The operations of method 1500 may be implemented by a base station 105 or its components as described herein. For example, the operations of method 1500 may be performed by a communications manager as described with reference to FIGS. 1 through 12. In some examples, a base station may execute a set of instructions to control the functional elements of the base station to perform the functions described below. Additionally or alternatively, a base station may perform aspects of the functions described below using special-purpose hardware.

At 1505, the base station may schedule a set of UEs for transmitting respective UCI within a first set of frequency resources of an uplink slot. The operations of 1505 may be performed according to the methods described herein. In some examples, aspects of the operations of 1505 may be performed by a scheduling component as described with reference to FIGS. 7 through 10. In some cases, the base station may schedule the set of UEs upon receiving a UE configuration that indicates the set of UEs. The base station may transmit a scheduling configuration indicating the first set of frequency resources to the scheduled UEs. In some cases, the first set of frequency resources may comprise one or more tones (e.g., or sub channels) of a resource block.

At 1510, the base station may transmit, to each of the set of UEs, a configuration to spread modulation symbols of the respective UCI using a set of respective spreading codes prior to performing a DFT spreading process, where the set of respective spreading codes include orthogonal cover codes. The operations of 1510 may be performed according to the methods described herein. In some examples, aspects of the operations of 1510 may be performed by a spreading code configuring component as described with reference to FIGS. 7 through 10.

In some cases, the base station may determine (e.g., or be configured with) the set of the respective spreading codes. The base station may configure each of the set of UEs to spread modulation symbols of the respective UCI using a set of respective spreading codes prior to performing a DFT spreading process, where the set of respective spreading codes include orthogonal cover codes. In some cases, the respective spreading codes are Fourier basis orthogonal cover codes. In some cases, the respective spreading codes are Hadamard matrix based orthogonal cover codes. In some cases, the respective spreading codes may be selected such that uplink transmissions from different ones of the plurality of UEs are orthogonal in the frequency domain after the DFT process. In some cases, the frequency domain orthogonality may include frequency division multiplexing of the uplink transmissions from the different ones of the plurality of UEs.

At 1515, the base station may receive, over the first set of frequency resources of the uplink slot, a set of multiplexed uplink transmissions from the set of UEs including the respective UCI. The operations of 1515 may be performed according to the methods described herein. In some examples, aspects of the operations of 1515 may be performed by an UCI receiving component as described with reference to FIGS. 7 through 10. In some cases, the multiplexed uplink transmissions may be one or more time-domain waveforms of UCI from a plurality of UEs.

At 1520, the base station may perform a DFT process on the set of multiplexed uplink transmissions. The operations of 1520 may be performed according to the methods described herein. In some examples, aspects of the operations of 1520 may be performed by a DFT component as described with reference to FIGS. 7 through 10. In some cases, the base station may transform the set of multiplexed uplink transmissions into symbols.

At 1525, the base station may demap the set of multiplexed uplink transmissions. The operations of 1525 may be performed according to the methods described herein. In some examples, aspects of the operations of 1525 may be performed by a demapping component as described with reference to FIGS. 7 through 10. In some cases, the base station may demodulate symbols of the multiplexed uplink transmissions into demapped symbols, where the multiplexed uplink transmissions may be symbols that have been transformed according to a DFT process.

At 1530, the base station may despread the set of multiplexed uplink transmissions according to the set of respective spreading codes to obtain the respective UCI. The operations of 1530 may be performed according to the methods described herein. In some examples, aspects of the operations of 1530 may be performed by a despreading component as described with reference to FIGS. 7 through 10. In some cases, the base station may despread the demapped symbols of the multiplexed uplink transmissions in accordance with a spreading process as performed by the set of UEs to recover the uplink information transmitted by the set of UEs. In some cases, such a despreading process may involve extracting bits (e.g., or symbols) from one or more of the frequency domain or the time domain.

Figure 16:
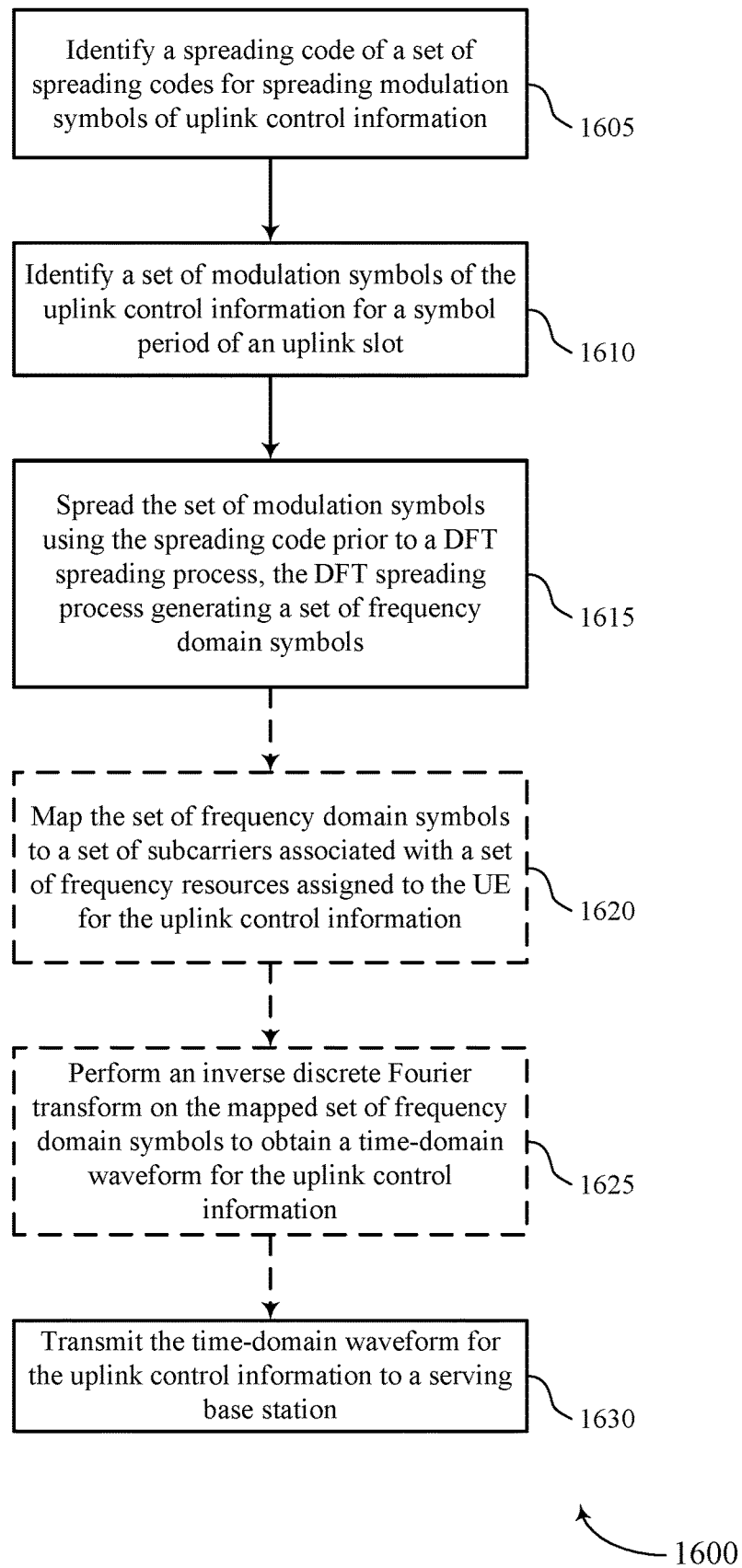

FIG. 16 shows a flowchart illustrating a method 1600 for user multiplexing for UCI in accordance with aspects of the present disclosure. The operations of method 1600 may be implemented by a UE 115 or its components as described herein. For example, the operations of method 1600 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a spreading code of a plurality of spreading codes for spreading modulation symbols of UCI. The operations of block 1605 may be performed according to the methods described herein. In certain examples, aspects of the operations of block 1605 may be performed by a spreading code component as described with reference to FIGS. 11 through 14. In some cases, the UE 115 may receive the plurality of spreading codes from a base station 105. The plurality of spreading codes may include orthogonal cover codes. In some examples, the spreading code is a Fourier basis orthogonal cover code. In some instances, the spreading code is a Hadamard matrix based orthogonal cover code. In some cases, the spreading code may comprise one or more scalars (e.g., 1, −1, j, or −j).

At block 1610 the UE 115 may identify a set of modulation symbols of the UCI for a symbol period of an uplink slot. The operations of block 1610 may be performed according to the methods described herein. In certain examples, aspects of the operations of block 1610 may be performed by a modulation symbol component as described with reference to FIGS. 11 through 14. In some cases, the UE 115 may modulate the modulation symbols to a set of frequency domain symbols according to an identified spreading code. In some cases, the UE 115 may identify a second set of modulation symbols of the UCI for the symbol of the uplink slot, where the second set of modulation symbols is the same as the set of modulation symbols.

At block 1615 the UE 115 may spread the set of modulation symbols using the spreading code prior to a DFT spreading process, the DFT spreading process generating a set of frequency domain symbols. The operations of block 1615 may be performed according to the methods described herein. In certain examples, aspects of the operations of block 1615 may be performed by a spreading code component as described with reference to FIGS. 11 through 14. In some cases, the set of spreading codes include orthogonal cover codes. In some cases, the spreading code is applied to each modulation symbol of the set of modulation symbols. In some examples, the spreading code is a Fourier basis orthogonal cover code. In some instances, the spreading code is a Hadamard matrix based orthogonal cover code. In some examples, the spreading code component may spread the second set of modulation symbols using a scalar of the spreading code prior to the DFT spreading process At block 1620 the UE 115 may map the set of frequency domain symbols to a set of subcarriers associated with a set of frequency resources assigned to the UE for the UCI. The operations of block 1620 may be performed according to the methods described herein. In certain examples, aspects of the operations of block 1620 may be performed by a demapping component as described with reference to FIGS. 11 through 14. In some cases, the number of subcarriers of the set of subcarriers may be based on the number of available subcarriers and the number of UEs 115 configured to utilize the subcarriers. For example, when four UEs 115 are configured to utilize twelve subcarriers, each UE 115 may map their respective set of frequency domain symbols to a different set of three subcarriers.

At block 1625 the UE 115 may perform an inverse discrete Fourier transform on the mapped set of frequency domain symbols to obtain a time-domain waveform for the UCI. The operations of block 1625 may be performed according to the methods described herein. In certain examples, aspects of the operations of block 1625 may be performed by an inverse DFT component as described with reference to FIGS. 11 through 14. In some cases, the mapped set of frequency domain symbols may be based on a mapping procedure performed by the UE 115.

At block 1630 the UE 115 may transmit the time-domain waveform for the UCI to a serving base station. The operations of block 1630 may be performed according to the methods described herein. In certain examples, aspects of the operations of block 1630 may be performed by a UCI transmitting component as described with reference to FIGS. 11 through 14. In some cases, the time-domain waveform may be multiplexed with one or more other time-domain waveforms associated with one or more other UEs 115.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a spreading code of a plurality of spreading codes for spreading a set of modulation symbols of uplink control information, wherein the spreading code is based at least in part on a Fourier basis cover code, and wherein each of the plurality of spreading codes has a form given by [1, exp(i*2*pi/n*(n−1)), 1, exp(i*2*pi/n*(n -1)*2), . . . , 1, exp(i*2*pi/n *(n−1)*(n−1))];
spreading the set of modulation symbols using the spreading code prior to a discrete Fourier transform (DFT) spreading process, the DFT spreading process generating a set of frequency domain symbols, wherein spreading the set of modulation symbols using the spreading code comprises:
generating a plurality of sets of modulation symbols from the set of modulation symbols, each of the plurality of sets of modulation symbols comprising a repetition of the set of modulation symbols; and
applying each value of the spreading code to a respective one of the plurality of sets of modulation symbols; and
transmitting a time-domain waveform obtained from the set of frequency domain symbols to a serving base station in a symbol period of an uplink slot, wherein a maximum value of n is based at least in part on a quantity of user equipment configured for transmitting to the serving base station in the symbol period of the uplink slot.

2. The method of claim 1, wherein:
the plurality of spreading codes comprise orthogonal cover codes.

3. The method of claim 1, further comprising:
mapping the set of frequency domain symbols to a set of subcarriers associated with a set of frequency resources assigned for the uplink control information.

4. The method of claim 3, wherein transmitting the time-domain waveform for the uplink control information to the serving base station further comprises:
performing an inverse discrete Fourier transform on the mapped set of frequency domain symbols to obtain the time-domain waveform for the uplink control information.

5. The method of claim 1, wherein the spreading the set of modulation symbols comprises:
applying the spreading code to each modulation symbol of the set of modulation symbols.

6. The method of claim 1, wherein the plurality of spreading codes are based at least in part on a Fourier sequence, and wherein each of the plurality of spreading codes is orthogonal to the other spreading codes of the plurality of spreading codes.

7. The method of claim 1, wherein the plurality of spreading codes comprises:

a first spreading code, wherein the first spreading code is based at least in part on a first sequence [1, 1], and
a second spreading code of the plurality of spreading codes that is based at least in part on a second sequence [1, −1].

8. The method of claim 1, wherein the plurality of spreading codes comprises:
a first spreading code, wherein the first spreading code is based at least in part on a first sequence [1, 1, 1, 1],
a second spreading code of the plurality of spreading codes that is based at least in part on a second sequence [1, −j, −1, j],
a third spreading code of the plurality of spreading codes that is based at least in part on a third sequence [1, −1, 1, −1], and
a fourth spreading code of the plurality of spreading codes that is based at least in part on a fourth sequence [1, j, −1, −j].

9. The method of claim 1, wherein:
the spreading code is associated with a first user equipment (UE) and the set of frequency domain symbols,
a second spreading code of the plurality of spreading codes is associated with a second UE and a second set of frequency domain symbols generated by a second DFT spreading process,
a third spreading code of the plurality of spreading codes is associated with a third UE and a third set of frequency domain symbols generated by a third DFT spreading process, and
a fourth spreading code of the plurality of spreading codes is associated with a fourth UE and a fourth set of frequency domain symbols generated by a fourth DFT spreading process.

10. The method of claim 9, wherein each of the first, second, third, and fourth sets of frequency domain symbols is non-overlapping in the frequency domain with one another.

11. A method for wireless communication, comprising:
scheduling, at a base station, a plurality of user equipments (UEs) for transmitting respective uplink control information within a first set of frequency resources of an uplink slot; and
transmitting, to each of the plurality of UEs, a configuration to spread modulation symbols of the respective uplink control information using a plurality of respective spreading codes prior to performing a discrete Fourier transform (DFT) spreading process, wherein the plurality of respective spreading codes are based at least in part on Fourier basis cover codes, and wherein:
each of the plurality of respective spreading codes has a form given by [1, exp(i*2*pi/n*(n−1)), 1, exp(i*2*pi/n*(n−1)*2), . . . , 1, exp(i*2*pi/n*(n−1)*(n−1))], wherein a maximum value of n is based at least in part on a quantity of the plurality of UEs configured for transmitting to the base station in the uplink slot.

12. The method of claim 11, further comprising:
receiving, over the first set of frequency resources of the uplink slot, a plurality of multiplexed uplink transmissions from the plurality of UEs comprising the respective uplink control information;
demapping the plurality of multiplexed uplink transmissions; and
despreading the plurality of multiplexed uplink transmissions according to the plurality of respective spreading codes to obtain the respective uplink control information.

13. The method of claim 11, wherein:
the respective spreading codes are selected such that uplink transmissions from different ones of the plurality of UEs are orthogonal in the frequency domain after the DFT spreading process.

14. The method of claim 13, wherein:
the frequency domain orthogonality includes frequency division multiplexing of the uplink transmissions from the different ones of the plurality of UEs.

15. The method of claim 11, wherein:
a first spreading code of the plurality of respective spreading codes is associated with a first user equipment (UE) and a first set of frequency domain symbols generated by a first DFT spreading process,
a second spreading code of the plurality of respective spreading codes is associated with a second UE and a second set of frequency domain symbols generated by a second DFT spreading process,
a third spreading code of the plurality of respective spreading codes is associated with a third UE and a third set of frequency domain symbols generated by a third DFT spreading process, and
a fourth spreading code of the plurality of respective spreading codes is associated with a fourth UE and a fourth set of frequency domain symbols generated by a fourth DFT spreading process.

16. The method of claim 15, wherein each of the first, second, third, and fourth sets of frequency domain symbols is non-overlapping in the frequency domain with one another.

17. An apparatus for wireless communication, comprising:
means for identifying a spreading code of a plurality of spreading codes for spreading at set of modulation symbols of uplink control information, wherein the spreading code is based at least in part on a Fourier basis cover code, and wherein each of the plurality of spreading codes has a form given by [1, exp(i*2*pi/n*(n−1)), 1, exp(i*2*pi/n *(n−1)*2), 1, exp(i*2*pi/n *(n−1)*(n−1))];
means for spreading the set of modulation symbols using the spreading code prior to a discrete Fourier transform (DFT) spreading process, the DFT spreading process generating a set of frequency domain symbols, wherein the means for spreading the set of modulation symbols using the spreading code comprises:
means for generating a plurality of sets of modulation symbols from the set of modulation symbols, each of the plurality of sets of modulation symbols comprising a repetition of the set of modulation symbols; and
means for applying each value of the spreading code to a respective one of the plurality of sets of modulation symbols; and
means for transmitting a time-domain waveform obtained from the set of frequency domain symbols to a serving base station in a symbol period of an uplink slot, wherein a maximum value of n is based at least in part on a quantity of user equipment configured for transmitting to the serving base station in the symbol period of the uplink slot.

18. The apparatus of claim 17, wherein:
the plurality of spreading codes comprise orthogonal cover codes.

19. The apparatus of claim 17, further comprising:
means for mapping the set of frequency domain symbols to a set of subcarriers associated with a set of frequency resources assigned for the uplink control information.

20. The apparatus of claim 19, wherein means for transmitting the time-domain waveform for the uplink control information to the serving base station further comprises:
means for performing an inverse discrete Fourier transform on the mapped set of frequency domain symbols to obtain the time-domain waveform for the uplink control information.

21. The apparatus of claim 17, wherein the means for spreading the set of modulation symbols applies the spreading code to each modulation symbol of the set of modulation symbols.

22. An apparatus for wireless communication, comprising:
means for scheduling, at a base station, a plurality of user equipments (UEs) for transmitting respective uplink control information within a first set of frequency resources of an uplink slot; and
means for transmitting, to each of the plurality of UEs, a configuration to spread modulation symbols of the respective uplink control information using a plurality of respective spreading codes prior to performing a discrete Fourier transform (DFT) spreading process, wherein the plurality of respective spreading codes are based at least in part on Fourier basis cover codes, and wherein:
each of the plurality of respective spreading codes has a form given by $[1, \exp(i*2*pi/n*(n-1)), 1, \exp(i*2*pi/n*(n-1)*2), \ldots, 1, \exp(i*2*pi/n*(n-1)*(n-1))]$, wherein a maximum value of n is based at least in part on a quantity of the plurality of UEs configured for transmitting to the base station in the uplink slot.

23. The apparatus of claim 22, further comprising:
means for receiving, over the first set of frequency resources of the uplink slot, a plurality of multiplexed uplink transmissions from the plurality of UEs comprising the respective uplink control information;
means for demapping the plurality of multiplexed uplink transmissions; and
means for despreading the plurality of multiplexed uplink transmissions according to the plurality of respective spreading codes to obtain the respective uplink control information.

24. The apparatus of claim 22, wherein:
the respective spreading codes are selected such that uplink transmissions from different ones of the plurality of UEs are orthogonal in the frequency domain after the DFT spreading process.

25. The apparatus of claim 24, wherein:
the frequency domain orthogonality includes frequency division multiplexing of the uplink transmissions from the different ones of the plurality of UEs.

26. An apparatus for wireless communication, comprising:
a processor;
memory coupled with the processor; and
instructions stored in the memory and operable, when executed by the processor, to cause the apparatus to:
identify a spreading code of a plurality of spreading codes for spreading a
set of modulation symbols of uplink control information, wherein the spreading code is based at least in part on a Fourier basis cover code, and wherein each of the plurality of spreading codes has a form given by $[1, \exp(i*2*pi/n*(n-1)), 1, \exp(i*pi/n*(n-1)*2), \ldots, 1, \exp(i*2*pi/n*(n-1)*(n-1))]$;
spread the set of modulation symbols using the spreading code prior to a discrete Fourier transform (DFT) spreading process, the DFT spreading process generating a set of frequency domain symbols, wherein the instructions that when executed by the processor cause the apparatus to spread the set of modulation symbols using the spreading code further cause the apparatus to:
generate a plurality of sets of modulation symbols from the set of modulation symbols, each of the plurality of sets of modulation symbols comprising repetition of the set of modulation symbols; and
apply each value of the spreading code to a respective one of the plurality of sets of modulation symbols; and
transmit a time-domain waveform obtained from the set of frequency domain symbols to a serving base station in a symbol period of an uplink slot, wherein a maximum value of n is based at least in part on a quantity of user equipment configured for transmitting to the serving base station in the symbol period of the uplink slot.

27. The apparatus of claim 26, wherein:
the plurality of spreading codes comprise orthogonal cover codes.

28. The apparatus of claim 26, wherein the instructions are further executable to cause the apparatus to:
map the set of frequency domain symbols to a set of subcarriers associated with a set of frequency resources assigned for the uplink control information.

29. The apparatus of claim 28, wherein the instructions are further executable to cause the apparatus to:
perform an inverse discrete Fourier transform on the mapped set of frequency domain symbols to obtain the time-domain waveform for the uplink control information.

30. The apparatus of claim 26, wherein the instructions are further executable to cause the apparatus to:
apply the spreading code to each modulation symbol of the set of modulation symbols.

31. The apparatus of claim 26, wherein the plurality of spreading codes comprises:
a first spreading code, wherein the first spreading code is based at least in part on a first sequence [1, 1], and
a second spreading code of the plurality of spreading codes that is based at least in part on a second sequence [1, −1].

32. The apparatus of claim 26, wherein the plurality of spreading codes comprises:
a first spreading code, wherein the first spreading code is based at least in part on a first sequence [1, 1, 1, 1],
a second spreading code of the plurality of spreading codes that is based at least in part on a second sequence [1, −j, −1, j],
a third spreading code of the plurality of spreading codes that is based at least in part on a third sequence [1, −1, 1, −1], and
a fourth spreading code of the plurality of spreading codes that is based at least in part on a fourth sequence [1, j, −1, −j].

33. The apparatus of claim 26, wherein:
the spreading code is associated with a first user equipment (UE) and the set of frequency domain symbols,
a second spreading code of the plurality of spreading codes is associated with a second UE and a second set of frequency domain symbols generated by a second DFT spreading process, a third spreading code of the plurality of spreading codes is associated with a third UE and a third set of frequency domain symbols generated by a third DFT spreading process, and a fourth spreading code of the plurality of spreading codes is associated with a fourth UE and a fourth set of frequency domain symbols generated by a fourth DFT spreading process.

34. The apparatus of claim 33, wherein each of the first, second, third, and fourth sets of frequency domain symbols is non-overlapping in the frequency domain with one another.

35. An apparatus for wireless communication, comprising:
a processor;
memory coupled with the processor; and
instructions stored in the memory and operable, when executed by the processor, to cause the apparatus to:
schedule, at a base station, a plurality of user equipments (UEs) for transmitting respective uplink control information within a first set of frequency resources of an uplink slot; and
transmit, to each of the plurality of UEs, a configuration to spread modulation symbols of the respective uplink control information using a plurality of respective spreading codes prior to performing a discrete Fourier transform (DFT) spreading process, wherein the plurality of respective spreading codes are based at least in part on Fourier basis cover codes, and wherein:
each of the plurality of respective spreading codes has a form given by [1, $\exp(i*2*pi/n*(n-1))$, 1, $\exp(i*2*pi/n*(n-1)*2)$, ..., 1, $\exp(i*2*pi/n*(n-1)*(n-1))$], wherein a maximum value of n is based at least in part on a quantity of the plurality of UEs configured for transmitting to the base station in the uplink slot.

36. The apparatus of claim 35, wherein the instructions are further executable by the processor to:
receive, over the first set of frequency resources of the uplink slot, a plurality of multiplexed uplink transmissions from the plurality of UEs comprising the respective uplink control information;
demap the plurality of multiplexed uplink transmissions; and
despread the plurality of multiplexed uplink transmissions according to the plurality of respective spreading codes to obtain the respective uplink control information.

37. The apparatus of claim 36, wherein:
the respective spreading codes are selected such that uplink transmissions from different ones of the plurality of UEs are orthogonal in the frequency domain after the DFT spreading process.

38. The apparatus of claim 37, wherein:
the frequency domain orthogonality includes frequency division multiplexing of the uplink transmissions from the different ones of the plurality of UEs.

39. The apparatus of claim 35, wherein:
a first spreading code of the plurality of respective spreading codes is associated with a first user equipment (UE) and a first set of frequency domain symbols generated by a first DFT spreading process,
a second spreading code of the plurality of respective spreading codes is associated with a second UE and a second set of frequency domain symbols generated by a second DFT spreading process, a third spreading code of the plurality of respective spreading codes is associated with a third UE and a third set of frequency domain symbols generated by a third DFT spreading process, and a fourth spreading code of the plurality of respective spreading codes is associated with a fourth UE and a fourth set of frequency domain symbols generated by a fourth DFT spreading process.

40. The apparatus of claim 39, wherein each of the first, second, third, and fourth sets of frequency domain symbols is non-overlapping in the frequency domain with one another.

41. A non-transitory computer-readable medium storing code for wireless communication, the code comprising instructions executable by a processor to:
identify a spreading code of a plurality of spreading codes for spreading a set of modulation symbols of uplink control information, wherein the spreading code is based at least in part on a Fourier basis cover code, and wherein each of the plurality of spreading codes has a form given by [1, $\exp(i*2*pi/n*(n-1))$, 1, $\exp(i*2*pi/n*(n-1)*2)$, ..., 1, $\exp(i*2*pi/n *(n-1)*(n-1))$];
spread the set of modulation symbols using the spreading code prior to a discrete Fourier transform (DFT) spreading process, the DFT spreading process generating a set of frequency domain symbols, wherein the instructions executable by the processor to spread the set of modulation symbols using the spreading code are further executable by the processor to:
generate a plurality of sets of modulation symbols from the set of modulation symbols, each of the plurality of sets of modulation symbols comprising repetitions a repetition of the set of modulation symbols; and
apply each value of the spreading code to a respective one of the plurality of sets of modulation symbols; and
transmit a time-domain waveform obtained from the set of frequency domain symbols to a serving base station in a symbol period of an uplink slot, wherein a maximum value of n is based at least in part on a quantity of user equipment configured for transmitting to the serving base station in the symbol period of the uplink slot.

42. The non-transitory computer-readable medium of claim 41, wherein:
the plurality of spreading codes comprise orthogonal cover codes.

43. The non-transitory computer-readable medium of claim 41, wherein the instructions are further executable by the processor to:
map the set of frequency domain symbols to a set of subcarriers associated with a set of frequency resources assigned for the uplink control information.

44. The non-transitory computer-readable medium of claim 43, wherein the instructions are further executable by the processor to:
perform an inverse discrete Fourier transform on the mapped set of frequency domain symbols to obtain the time-domain waveform for the uplink control information.

45. The non-transitory computer-readable medium of claim 41, wherein the instructions are further executable by the processor to:
apply the spreading code to each modulation symbol of the set of modulation symbols.

46. A non-transitory computer readable medium storing code for wireless communication, the code comprising instructions executable by a processor to:
  schedule, at a base station, a plurality of user equipments (UEs) for transmitting respective uplink control information within a first set of frequency resources of an uplink slot; and
  transmit, to each of the plurality of UEs, a configuration to spread modulation symbols of the respective uplink control information using a plurality of respective spreading codes prior to performing a discrete Fourier transform (DFT) spreading process, wherein the plurality of respective spreading codes are based at least in part on Fourier basis cover codes, and wherein:
    each of the plurality of respective spreading codes has a form given by [1, exp(i*2*pi/n*(n−1)), 1, exp(i*2*pi/n*(n−1)*2), . . . , 1, exp(i*2*pi/n*(n−1)*(n−1))], wherein a maximum value of n is based at least in part on a quantity of the plurality of UEs configured for transmitting to the base station in the uplink slot.

47. The non-transitory computer-readable medium of claim 46, wherein the instructions are further executable by the processor to:
  receive, over the first set of frequency resources of the uplink slot, a plurality of multiplexed uplink transmissions from the plurality of UEs comprising the respective uplink control information;
  demap the plurality of multiplexed uplink transmissions; and
  despread the plurality of multiplexed uplink transmissions according to the plurality of respective spreading codes to obtain the respective uplink control information.

48. The non-transitory computer-readable medium of claim 47, wherein:
  the respective spreading codes are selected such that uplink transmissions from different ones of the plurality of UEs are orthogonal in the frequency domain after the DFT spreading process.

49. The non-transitory computer-readable medium of claim 48, wherein:
  the frequency domain orthogonality includes frequency division multiplexing of the uplink transmissions from the different ones of the plurality of UEs.

* * * * *